(12) United States Patent
Landberger et al.

(10) Patent No.: US 12,472,814 B2
(45) Date of Patent: Nov. 18, 2025

(54) RECREATIONAL VEHICLE USER INTERFACE

(71) Applicant: Dometic Sweden AB, Solna (SE)

(72) Inventors: Ulf Landberger, Spanga (SE); Rickard Hederstierna, Hägersten (SE)

(73) Assignee: Dometic Sweden AB, Solna (SE)

( * ) Notice: Subject to any disclaimer, the term of this patent is extended or adjusted under 35 U.S.C. 154(b) by 282 days.

(21) Appl. No.: 18/245,320

(22) PCT Filed: Sep. 15, 2021

(86) PCT No.: PCT/EP2021/075389
§ 371 (c)(1),
(2) Date: Mar. 14, 2023

(87) PCT Pub. No.: WO2022/058389
PCT Pub. Date: Mar. 24, 2022

(65) Prior Publication Data
US 2023/0356592 A1      Nov. 9, 2023

(30) Foreign Application Priority Data
Sep. 18, 2020   (EP) .................................... 20197019

(51) Int. Cl.
*B60K 35/10* (2024.01)
*B60K 35/50* (2024.01)
(Continued)

(52) U.S. Cl.
CPC .............. *B60K 35/10* (2024.01); *B60K 35/50* (2024.01); *B60K 35/80* (2024.01); *B60K 35/28* (2024.01);
(Continued)

(58) Field of Classification Search
None
See application file for complete search history.

(56) References Cited

U.S. PATENT DOCUMENTS

| 4,916,909 A | 4/1990 | Mathur et al. |
| 5,424,720 A | 6/1995 | Kirkpatrick |

(Continued)

FOREIGN PATENT DOCUMENTS

| AT | 263982 T | 4/2004 |
| AT | 439486 T | 8/2009 |

(Continued)

OTHER PUBLICATIONS

US D887,373 S, 06/2020, Becker (withdrawn)
(Continued)

*Primary Examiner* — Peter D Nolan
*Assistant Examiner* — Matthew Cobb
(74) *Attorney, Agent, or Firm* — Dinsmore & Shohl LLP

(57) ABSTRACT

The present disclosure generally relates to a method implemented in a Recreational Vehicle User Interface (RVUI) and a corresponding RVUI for controlling one or several functions of a recreational vehicle (RV). A circular-shaped user input element is displayed at a touchscreen of the RVUI. Furthermore, a user input is detected at the touchscreen of the RVUI. This user input comprises a movement along the displayed circular-shaped user input element. The movement is indicative of a request to control a user-selected function of the recreational vehicle. The user-selected function includes any one or a combination of: a climate control function, a heater function, a ventilation function, a water heater function, a vehicle battery function, a light control function, and a security alarm function. Responsive to detecting this user input, control of the user-selected function is initiated, or otherwise triggered.

13 Claims, 9 Drawing Sheets

(51) Int. Cl.
*B60K 35/80* (2024.01)
*B60K 35/28* (2024.01)

(52) U.S. Cl.
CPC ..... *B60K 2360/11* (2024.01); *B60K 2360/126* (2024.01); *B60K 2360/1438* (2024.01); *B60K 2360/1468* (2024.01); *B60K 2360/162* (2024.01)

(56) References Cited

U.S. PATENT DOCUMENTS

| | | |
|---|---|---|
| 5,632,614 A | 5/1997 | Consadori et al. |
| D397,909 S | 9/1998 | Ashcraft et al. |
| 5,931,151 A | 8/1999 | Van Dore et al. |
| 6,134,906 A | 10/2000 | Eastman |
| 6,259,227 B1 | 7/2001 | Gherman et al. |
| 6,460,356 B1 | 10/2002 | Tao et al. |
| 6,591,622 B1 | 7/2003 | Gherman et al. |
| 6,729,144 B1 | 5/2004 | Kupferman |
| 6,856,820 B1 | 2/2005 | Kolls |
| 6,863,222 B2 | 3/2005 | Slifkin et al. |
| 6,929,061 B2 | 8/2005 | Lajeunesse |
| 7,082,380 B2 | 7/2006 | Wiebe et al. |
| 7,117,051 B2 | 10/2006 | Landry et al. |
| 7,131,282 B2 | 11/2006 | Karlsson et al. |
| 7,412,837 B2 | 8/2008 | Karisson et al. |
| 7,423,392 B2 | 9/2008 | Gill |
| 7,448,546 B2 | 11/2008 | Jung et al. |
| D588,479 S | 3/2009 | Giese |
| D604,305 S | 11/2009 | Anzures et al. |
| 7,707,845 B2 | 5/2010 | Bilodeau |
| 7,739,882 B2 | 6/2010 | Evans et al. |
| 7,849,699 B2 | 12/2010 | Allen |
| 8,307,667 B2 | 11/2012 | Rusignuolo et al. |
| 8,374,824 B2 | 2/2013 | Schwiers et al. |
| 8,461,958 B2 | 6/2013 | Saenz et al. |
| 8,539,783 B1 | 9/2013 | Bunch |
| 8,545,113 B2 | 10/2013 | Johnson et al. |
| 8,549,131 B2 | 10/2013 | Keyghobad et al. |
| 8,653,949 B2 | 2/2014 | Lee et al. |
| 8,960,563 B1 | 2/2015 | Perten et al. |
| 8,981,930 B2 | 3/2015 | Horstemeyer et al. |
| D738,355 S | 9/2015 | Smith et al. |
| 9,193,312 B2 | 11/2015 | Colella et al. |
| D756,333 S | 5/2016 | Smith et al. |
| D757,691 S | 5/2016 | Smith et al. |
| D761,232 S | 7/2016 | Smith et al. |
| D766,217 S | 9/2016 | Smith et al. |
| 9,454,897 B2 | 9/2016 | Cattermole et al. |
| D795,712 S | 8/2017 | Bergin et al. |
| D823,265 S | 7/2018 | Meda et al. |
| D834,961 S | 12/2018 | Bergin et al. |
| D839,318 S | 1/2019 | Meda et al. |
| D846,505 S | 4/2019 | Becker |
| D865,914 S | 11/2019 | Snyder |
| 10,675,941 B2 | 6/2020 | Williamson et al. |
| 10,696,129 B2 | 6/2020 | Berger |
| D893,436 S | 8/2020 | Becker |
| 10,747,404 B2 | 8/2020 | Liddell et al. |
| 10,941,955 B2 | 3/2021 | Heral |
| 11,239,774 B2 | 2/2022 | Becker |
| 11,254,183 B2 | 2/2022 | Peter et al. |
| D947,699 S | 4/2022 | Schuh et al. |
| 2003/0070444 A1 | 4/2003 | Volker et al. |
| 2003/0164754 A1 | 9/2003 | Roseen |
| 2004/0178889 A1 | 9/2004 | Buckingham et al. |
| 2005/0141154 A1 | 6/2005 | Consadori et al. |
| 2006/0123807 A1 | 6/2006 | Sullivan et al. |
| 2007/0023180 A1 | 2/2007 | Komarek et al. |
| 2007/0028635 A1 | 2/2007 | Gleeson |
| 2008/0087663 A1 | 4/2008 | Mansbery et al. |
| 2008/0115513 A1 | 5/2008 | Unmack |
| 2008/0121729 A1 | 5/2008 | Gray |
| 2008/0299961 A1 | 12/2008 | Muller et al. |
| 2009/0109004 A1 | 4/2009 | Van Alstyne |
| 2009/0139246 A1 | 6/2009 | Lifson et al. |
| 2010/0274604 A1 | 10/2010 | Crilly |
| 2012/0255317 A1 | 10/2012 | Leistner et al. |
| 2014/0148975 A1 | 5/2014 | Self et al. |
| 2014/0210593 A1 | 7/2014 | Cattermole et al. |
| 2014/0313055 A1 | 10/2014 | Warkentin et al. |
| 2015/0184442 A1 | 7/2015 | Gantman et al. |
| 2015/0198937 A1 | 7/2015 | Wait |
| 2016/0129832 A1* | 5/2016 | Zakhem .......... B60K 35/28 315/77 |
| 2016/0144764 A1 | 5/2016 | Dutta et al. |
| 2016/0211985 A1 | 7/2016 | Castillo et al. |
| 2016/0214621 A1 | 7/2016 | Baalu et al. |
| 2017/0264224 A1 | 9/2017 | Becker |
| 2017/0285712 A1* | 10/2017 | Veloso .......... G06F 3/0488 |
| 2017/0372600 A1 | 12/2017 | Palin et al. |
| 2018/0134116 A1 | 5/2018 | Chen et al. |
| 2018/0147913 A1 | 5/2018 | Bergin |
| 2018/0191687 A1 | 7/2018 | Munafo |
| 2019/0003765 A1 | 1/2019 | Chen et al. |
| 2019/0121435 A1* | 4/2019 | Liddell .......... G06F 3/016 |
| 2019/0128551 A1 | 5/2019 | Heral |
| 2020/0217575 A1 | 7/2020 | Thelin et al. |
| 2020/0298655 A1 | 9/2020 | Williamson et al. |
| 2020/0313871 A1 | 10/2020 | Troia et al. |
| 2020/0338951 A1 | 10/2020 | Paci et al. |
| 2021/0142601 A1 | 5/2021 | Schoenfelder et al. |
| 2021/0229529 A1 | 7/2021 | Cai et al. |
| 2022/0114847 A1 | 4/2022 | Emde et al. |
| 2022/0114853 A1 | 4/2022 | Emde et al. |
| 2022/0148352 A1 | 5/2022 | Schuh |
| 2022/0410828 A1 | 12/2022 | Schuh et al. |

FOREIGN PATENT DOCUMENTS

| | | |
|---|---|---|
| AT | 483596 T | 10/2010 |
| AT | 504462 T | 4/2011 |
| AU | 2001280374 A1 | 5/2002 |
| AU | 2003217095 A1 | 9/2003 |
| AU | 2007200788 A1 | 9/2007 |
| AU | 2002335708 B2 | 4/2008 |
| AU | 2006259965 B2 | 6/2009 |
| AU | 2005239637 B2 | 12/2010 |
| AU | 2014246608 A1 | 3/2016 |
| AU | 1087016 S | 4/2016 |
| AU | 1175116 S | 5/2016 |
| AU | 201710975 S | 3/2017 |
| AU | 201710976 S | 3/2017 |
| AU | 1280417 S | 5/2017 |
| AU | 201712767 S | 5/2017 |
| AU | 201811509 S | 4/2018 |
| AU | 201811512 S | 4/2018 |
| AU | 2019284128 A1 | 7/2020 |
| AU | 2017364256 B2 | 2/2022 |
| AU | 2017222698 B2 | 6/2022 |
| AU | 2021343247 A1 | 3/2023 |
| CA | 2572005 A1 | 8/2007 |
| CA | 2578651 A1 | 8/2007 |
| CA | 2528368 C | 3/2011 |
| CA | 167369 S | 12/2016 |
| CA | 170638 S | 12/2016 |
| CA | 2948710 A1 | 9/2017 |
| CA | 174706 S | 5/2018 |
| CA | 179312 S | 5/2018 |
| CN | 2420532 Y | 2/2001 |
| CN | 1299034 A | 6/2001 |
| CN | 2434623 Y | 6/2001 |
| CN | 2524157 Y | 12/2002 |
| CN | 1116579 C | 7/2003 |
| CN | 1475763 A | 2/2004 |
| CN | 1178037 C | 12/2004 |
| CN | 1570929 A | 1/2005 |
| CN | 1761318 A | 4/2006 |
| CN | 1763450 A | 4/2006 |
| CN | 2769742 Y | 4/2006 |
| CN | 2780132 Y | 5/2006 |
| CN | 2811877 Y | 8/2006 |
| CN | 1828186 A | 9/2006 |
| CN | 2829654 Y | 10/2006 |

(56) References Cited

FOREIGN PATENT DOCUMENTS

| | | | |
|---|---|---|---|
| CN | 2849539 Y | 12/2006 |
| CN | 1888750 A | 1/2007 |
| CN | 1936533 A | 3/2007 |
| CN | 2878997 Y | 3/2007 |
| CN | 2906406 Y | 5/2007 |
| CN | 101063586 A | 10/2007 |
| CN | 200961918 Y | 10/2007 |
| CN | 101074816 A | 11/2007 |
| CN | 201000370 Y | 1/2008 |
| CN | 201015999 Y | 2/2008 |
| CN | 201028884 Y | 2/2008 |
| CN | 100373116 C | 3/2008 |
| CN | 100380075 C | 4/2008 |
| CN | 101153758 A | 4/2008 |
| CN | 201066217 Y | 5/2008 |
| CN | 100397004 C | 6/2008 |
| CN | 100398956 C | 7/2008 |
| CN | 101245936 A | 8/2008 |
| CN | 101245957 A | 8/2008 |
| CN | 100417880 C | 9/2008 |
| CN | 101266069 A | 9/2008 |
| CN | 201129824 Y | 10/2008 |
| CN | 201129825 Y | 10/2008 |
| CN | 201149349 Y | 11/2008 |
| CN | 201163244 Y | 12/2008 |
| CN | 201166753 Y | 12/2008 |
| CN | 201170678 Y | 12/2008 |
| CN | 101368771 A | 2/2009 |
| CN | 201191043 Y | 2/2009 |
| CN | 201196458 Y | 2/2009 |
| CN | 201209986 Y | 3/2009 |
| CN | 201230319 Y | 4/2009 |
| CN | 101435604 A | 5/2009 |
| CN | 201233076 Y | 5/2009 |
| CN | 201237396 Y | 5/2009 |
| CN | 101476563 A | 7/2009 |
| CN | 101498933 A | 8/2009 |
| CN | 201297694 Y | 8/2009 |
| CN | 201306900 Y | 9/2009 |
| CN | 201348340 Y | 11/2009 |
| CN | 201348413 Y | 11/2009 |
| CN | 100575078 C | 12/2009 |
| CN | 201363279 Y | 12/2009 |
| CN | 201363838 Y | 12/2009 |
| CN | 201363859 Y | 12/2009 |
| CN | 201363949 Y | 12/2009 |
| CN | 101665037 A | 3/2010 |
| CN | 101691863 A | 4/2010 |
| CN | 201486856 U | 5/2010 |
| CN | 201503133 U | 6/2010 |
| CN | 201539404 U | 8/2010 |
| CN | 201541754 U | 8/2010 |
| CN | 201546958 U | 8/2010 |
| CN | 201575541 U | 9/2010 |
| CN | 201589475 U | 9/2010 |
| CN | 1928445 B | 10/2010 |
| CN | 101251290 B | 10/2010 |
| CN | 101866173 A | 10/2010 |
| CN | 101363640 B | 11/2010 |
| CN | 201621800 U | 11/2010 |
| CN | 201622078 U | 11/2010 |
| CN | 201666251 U | 12/2010 |
| CN | 201672642 U | 12/2010 |
| CN | 201748559 U | 2/2011 |
| CN | 201749468 U | 2/2011 |
| CN | 101435616 B | 4/2011 |
| CN | 101464032 B | 4/2011 |
| CN | 102012146 A | 4/2011 |
| CN | 201820291 U | 5/2011 |
| CN | 101619882 B | 6/2011 |
| CN | 201849367 U | 6/2011 |
| CN | 201852224 U | 6/2011 |
| CN | 102118435 A | 7/2011 |
| CN | 201908838 U | 7/2011 |
| CN | 101586562 B | 8/2011 |
| CN | 102147125 A | 8/2011 |
| CN | 102151092 A | 8/2011 |
| CN | 102156466 A | 8/2011 |
| CN | 201923534 U | 8/2011 |
| CN | 201948819 U | 8/2011 |
| CN | 101435617 B | 9/2011 |
| CN | 102192569 A | 9/2011 |
| CN | 201964703 U | 9/2011 |
| CN | 201976127 U | 9/2011 |
| CN | 201982375 U | 9/2011 |
| CN | 102213518 A | 10/2011 |
| CN | 102235717 A | 11/2011 |
| CN | 102252369 A | 11/2011 |
| CN | 202050251 U | 11/2011 |
| CN | 202083072 U | 12/2011 |
| CN | 102338428 A | 2/2012 |
| CN | 102345951 A | 2/2012 |
| CN | 102355628 A | 2/2012 |
| CN | 102364319 A | 2/2012 |
| CN | 202177186 U | 3/2012 |
| CN | 101556069 B | 4/2012 |
| CN | 202186048 U | 4/2012 |
| CN | 101443719 B | 5/2012 |
| CN | 102444957 A | 5/2012 |
| CN | 102466296 A | 5/2012 |
| CN | 102478335 A | 5/2012 |
| CN | 101275800 B | 6/2012 |
| CN | 101788172 B | 7/2012 |
| CN | 101825087 B | 7/2012 |
| CN | 101846381 B | 7/2012 |
| CN | 101886852 B | 7/2012 |
| CN | 102042724 B | 7/2012 |
| CN | 102536819 A | 7/2012 |
| CN | 102564052 A | 7/2012 |
| CN | 102588285 A | 7/2012 |
| CN | 202287095 U | 7/2012 |
| CN | 202305190 U | 7/2012 |
| CN | 102032643 B | 8/2012 |
| CN | 102620517 A | 8/2012 |
| CN | 102650479 A | 8/2012 |
| CN | 101988839 B | 9/2012 |
| CN | 102679490 A | 9/2012 |
| CN | 102691660 A | 9/2012 |
| CN | 202431521 U | 9/2012 |
| CN | 202431522 U | 9/2012 |
| CN | 202442411 U | 9/2012 |
| CN | 202452784 U | 9/2012 |
| CN | 102705237 A | 10/2012 |
| CN | 202470336 U | 10/2012 |
| CN | 202475495 U | 10/2012 |
| CN | 202476017 U | 10/2012 |
| CN | 202501706 U | 10/2012 |
| CN | 202503538 U | 10/2012 |
| CN | 202511560 U | 10/2012 |
| CN | 101988717 B | 11/2012 |
| CN | 102765563 B | 11/2012 |
| CN | 202532335 U | 11/2012 |
| CN | 202563323 U | 11/2012 |
| CN | 102809202 B | 12/2012 |
| CN | 102840716 A | 12/2012 |
| CN | 202568984 U | 12/2012 |
| CN | 202581676 U | 12/2012 |
| CN | 202598971 U | 12/2012 |
| CN | 202613597 U | 12/2012 |
| CN | 202613835 U | 12/2012 |
| CN | 202630282 U | 12/2012 |
| CN | 102853624 A | 1/2013 |
| CN | 102878663 A | 1/2013 |
| CN | 102889748 A | 1/2013 |
| CN | 202648236 U | 1/2013 |
| CN | 202692596 U | 1/2013 |
| CN | 202708102 U | 1/2013 |
| CN | 202709553 U | 1/2013 |
| CN | 102914102 A | 2/2013 |
| CN | 202734071 U | 2/2013 |
| CN | 202734420 U | 2/2013 |
| CN | 202789544 U | 3/2013 |
| CN | 202835631 U | 3/2013 |
| CN | 102116515 B | 4/2013 |

(56) References Cited

FOREIGN PATENT DOCUMENTS

| | | | |
|---|---|---|---|
| CN | 103032933 A | 4/2013 |
| CN | 202851355 U | 4/2013 |
| CN | 202868893 U | 4/2013 |
| CN | 202868894 U | 4/2013 |
| CN | 202868919 U | 4/2013 |
| CN | 202868920 U | 4/2013 |
| CN | 103105204 A | 5/2013 |
| CN | 202916629 U | 5/2013 |
| CN | 203771639 U | 5/2013 |
| CN | 103162469 A | 6/2013 |
| CN | 103177339 A | 6/2013 |
| CN | 202967270 U | 6/2013 |
| CN | 202993659 U | 6/2013 |
| CN | 202993694 U | 6/2013 |
| CN | 103188655 A | 7/2013 |
| CN | 103196274 A | 7/2013 |
| CN | 203053481 U | 7/2013 |
| CN | 203068889 U | 7/2013 |
| CN | 103245007 A | 8/2013 |
| CN | 103245031 A | 8/2013 |
| CN | 103245033 A | 8/2013 |
| CN | 203116393 U | 8/2013 |
| CN | 203163367 U | 8/2013 |
| CN | 203164715 U | 8/2013 |
| CN | 103292572 A | 9/2013 |
| CN | 103322766 A | 9/2013 |
| CN | 203203288 U | 9/2013 |
| CN | 203203289 U | 9/2013 |
| CN | 203203317 U | 9/2013 |
| CN | 103335485 A | 10/2013 |
| CN | 103375870 A | 10/2013 |
| CN | 103375871 A | 10/2013 |
| CN | 103375935 A | 10/2013 |
| CN | 203310199 U | 11/2013 |
| CN | 103471297 A | 12/2013 |
| CN | 203324857 U | 12/2013 |
| CN | 203366082 U | 12/2013 |
| CN | 103512087 A | 1/2014 |
| CN | 103528142 A | 1/2014 |
| CN | 103574771 A | 2/2014 |
| CN | 103574772 A | 2/2014 |
| CN | 103578257 A | 2/2014 |
| CN | 103604272 A | 2/2014 |
| CN | 103616863 A | 3/2014 |
| CN | 103629740 A | 3/2014 |
| CN | 103629866 A | 3/2014 |
| CN | 103671119 A | 3/2014 |
| CN | 203489530 U | 3/2014 |
| CN | 103691835 A | 4/2014 |
| CN | 103745359 A | 4/2014 |
| CN | 203518373 U | 4/2014 |
| CN | 203550232 U | 4/2014 |
| CN | 203550407 U | 4/2014 |
| CN | 203561118 U | 4/2014 |
| CN | 203566105 U | 4/2014 |
| CN | 102705939 B | 5/2014 |
| CN | 103776090 A | 5/2014 |
| CN | 103776212 A | 5/2014 |
| CN | 103791684 A | 5/2014 |
| CN | 103807987 A | 5/2014 |
| CN | 103808012 A | 5/2014 |
| CN | 203586483 U | 5/2014 |
| CN | 203586488 U | 5/2014 |
| CN | 103836761 A | 6/2014 |
| CN | 103854344 A | 6/2014 |
| CN | 103884152 A | 6/2014 |
| CN | 203633039 U | 6/2014 |
| CN | 203664542 U | 6/2014 |
| CN | 103906529 A | 7/2014 |
| CN | 103925677 A | 7/2014 |
| CN | 103925678 A | 7/2014 |
| CN | 103925682 A | 7/2014 |
| CN | 103925753 A | 7/2014 |
| CN | 103925755 A | 7/2014 |
| CN | 103940053 A | 7/2014 |
| CN | 103940139 A | 7/2014 |
| CN | 103940157 A | 7/2014 |
| CN | 103954082 A | 7/2014 |
| CN | 103954087 A | 7/2014 |
| CN | 203706293 U | 7/2014 |
| CN | 203719239 U | 7/2014 |
| CN | 103968620 A | 8/2014 |
| CN | 103968631 A | 8/2014 |
| CN | 103968636 A | 8/2014 |
| CN | 103968963 A | 8/2014 |
| CN | 104006445 A | 8/2014 |
| CN | 104006597 A | 8/2014 |
| CN | 203796564 U | 8/2014 |
| CN | 104033996 A | 9/2014 |
| CN | 104048406 A | 9/2014 |
| CN | 104048448 A | 9/2014 |
| CN | 104050784 A | 9/2014 |
| CN | 203833232 U | 9/2014 |
| CN | 203837349 U | 9/2014 |
| CN | 203837396 U | 9/2014 |
| CN | 104089378 A | 10/2014 |
| CN | 104101124 A | 10/2014 |
| CN | 104101125 A | 10/2014 |
| CN | 104110740 A | 10/2014 |
| CN | 104121174 A | 10/2014 |
| CN | 104122463 A | 10/2014 |
| CN | 203867902 U | 10/2014 |
| CN | 203908094 U | 10/2014 |
| CN | 203908147 U | 10/2014 |
| CN | 203908786 U | 10/2014 |
| CN | 102958751 B | 11/2014 |
| CN | 104134292 A | 11/2014 |
| CN | 104139226 A | 11/2014 |
| CN | 104142001 A | 11/2014 |
| CN | 104154802 A | 11/2014 |
| CN | 104155964 A | 11/2014 |
| CN | 104165443 A | 11/2014 |
| CN | 104165483 A | 11/2014 |
| CN | 203928142 U | 11/2014 |
| CN | 203964436 U | 11/2014 |
| CN | 203964468 U | 11/2014 |
| CN | 203965900 U | 11/2014 |
| CN | 104180442 A | 12/2014 |
| CN | 104197632 A | 12/2014 |
| CN | 104199358 A | 12/2014 |
| CN | 104214887 A | 12/2014 |
| CN | 104215007 A | 12/2014 |
| CN | 104219289 A | 12/2014 |
| CN | 104236023 A | 12/2014 |
| CN | 104236198 A | 12/2014 |
| CN | 104236244 A | 12/2014 |
| CN | 104251591 A | 12/2014 |
| CN | 204006509 U | 12/2014 |
| CN | 204029050 U | 12/2014 |
| CN | 204044653 U | 12/2014 |
| CN | 204055526 U | 12/2014 |
| CN | 204063308 U | 12/2014 |
| CN | 204063678 U | 12/2014 |
| CN | 104266318 A | 1/2015 |
| CN | 104266423 A | 1/2015 |
| CN | 104279150 A | 1/2015 |
| CN | 104279716 A | 1/2015 |
| CN | 104279836 A | 1/2015 |
| CN | 104289021 A | 1/2015 |
| CN | 104296348 A | 1/2015 |
| CN | 104296489 A | 1/2015 |
| CN | 104315671 A | 1/2015 |
| CN | 204100662 U | 1/2015 |
| CN | 204115391 U | 1/2015 |
| CN | 104329831 A | 2/2015 |
| CN | 104344595 A | 2/2015 |
| CN | 104374044 A | 2/2015 |
| CN | 104374055 A | 2/2015 |
| CN | 104374117 A | 2/2015 |
| CN | 104374159 A | 2/2015 |
| CN | 104374161 A | 2/2015 |
| CN | 104374162 A | 2/2015 |
| CN | 204141931 U | 2/2015 |
| CN | 204143491 U | 2/2015 |

(56) References Cited

FOREIGN PATENT DOCUMENTS

| | | |
|---|---|---|
| CN | 204177417 U | 2/2015 |
| CN | 204178470 U | 2/2015 |
| CN | 104406271 A | 3/2015 |
| CN | 104422065 A | 3/2015 |
| CN | 104422198 A | 3/2015 |
| CN | 104422217 A | 3/2015 |
| CN | 104456846 A | 3/2015 |
| CN | 104457048 A | 3/2015 |
| CN | 104457072 A | 3/2015 |
| CN | 104457130 A | 3/2015 |
| CN | 104457132 A | 3/2015 |
| CN | 104467148 A | 3/2015 |
| CN | 204187779 U | 3/2015 |
| CN | 204202120 U | 3/2015 |
| CN | 104482712 A | 4/2015 |
| CN | 104501483 A | 4/2015 |
| CN | 104503309 A | 4/2015 |
| CN | 104515245 A | 4/2015 |
| CN | 104534618 A | 4/2015 |
| CN | 204270404 U | 4/2015 |
| CN | 204291654 U | 4/2015 |
| CN | 105444510 A | 3/2016 |
| CN | 304444504 S | 1/2018 |
| CN | 110568987 A * | 12/2019 ............ G06F 9/451 |
| CN | 210441529 U | 5/2020 |
| CN | 114517990 A | 5/2022 |
| DE | 10150819 A1 | 4/2003 |
| DE | 10161576 A1 | 6/2003 |
| DE | 69916310 | 5/2004 |
| DE | 202006010816 U1 | 2/2007 |
| DE | 202006020319 U1 | 7/2008 |
| DE | 60328750 | 9/2009 |
| DE | 202010009418 U1 | 11/2010 |
| DE | 602007009584 | 11/2010 |
| DE | 60336637 | 5/2011 |
| DE | 112017000915 T5 | 10/2018 |
| DE | 102017214941 A1 | 2/2019 |
| DE | 112017005541 T5 | 8/2019 |
| DE | 102019200063 A1 | 7/2020 |
| DE | 112018005002 T5 | 7/2020 |
| DE | 112020000798 T5 | 12/2021 |
| DK | 1413694 T3 | 11/2009 |
| DK | 1826041 T3 | 1/2011 |
| EP | 881443 A1 | 12/1998 |
| EP | 954083 A2 | 11/1999 |
| EP | 1304608 A1 | 4/2003 |
| EP | 1378981 A2 | 1/2004 |
| EP | 1127301 B1 | 4/2004 |
| EP | 1378981 A3 | 11/2006 |
| EP | 1826041 A1 | 8/2007 |
| EP | 1226394 B1 | 9/2007 |
| EP | 1879367 A1 | 1/2008 |
| EP | 2056534 A1 | 5/2009 |
| EP | 1478531 B1 | 4/2011 |
| EP | 2390601 A1 | 11/2011 |
| EP | 2733576 A1 * | 5/2014 ........... G06F 1/1692 |
| EP | 2769275 A4 | 4/2016 |
| EP | 2903859 B1 | 12/2017 |
| EP | 2462395 B1 | 1/2018 |
| EP | 3436752 A4 | 2/2020 |
| EP | 3910261 A4 | 11/2021 |
| EP | 3971661 A1 | 3/2022 |
| EP | 3971691 A1 | 3/2022 |
| EP | 3972314 A1 | 3/2022 |
| GB | 2399887 A | 9/2004 |
| JP | 2000357146 A | 12/2000 |
| JP | 2001183043 A | 7/2001 |
| JP | 2001208463 A | 8/2001 |
| JP | 2002092120 A | 3/2002 |
| JP | 2002092307 A | 3/2002 |
| JP | 2002162146 A | 6/2002 |
| JP | 2002228154 A | 8/2002 |
| JP | 2002236798 A | 8/2002 |
| JP | 2002295936 A | 10/2002 |
| JP | 2002295939 A | 10/2002 |
| JP | 2002295960 A | 10/2002 |
| JP | 2002295961 A | 10/2002 |
| JP | 2002342564 A | 11/2002 |
| JP | 2003022364 A | 1/2003 |
| JP | 2003090673 A | 3/2003 |
| JP | 2003162243 A | 6/2003 |
| JP | 2003207260 A | 7/2003 |
| JP | 2003242343 A | 8/2003 |
| JP | 2004005027 A | 1/2004 |
| JP | 2004086684 A | 3/2004 |
| JP | 2004259145 A | 9/2004 |
| JP | 2005098560 A | 4/2005 |
| JP | 2005101846 A | 4/2005 |
| JP | 2005164054 A | 6/2005 |
| JP | 2005284611 A | 10/2005 |
| JP | 2005293382 A | 10/2005 |
| JP | 2005311864 A | 11/2005 |
| JP | 2006011930 A | 1/2006 |
| JP | 2006250510 A | 9/2006 |
| JP | 2007046833 A | 2/2007 |
| JP | 2013238345 A | 11/2013 |
| JP | 2014209053 A | 11/2014 |
| KR | 20000030798 A | 6/2000 |
| KR | 20000071913 A | 12/2000 |
| KR | 20010077246 A | 8/2001 |
| KR | 20010077303 A | 8/2001 |
| KR | 20010094360 A | 11/2001 |
| KR | 20010094428 A | 11/2001 |
| KR | 20010105113 A | 11/2001 |
| KR | 20020004925 A | 1/2002 |
| KR | 20020009140 A | 2/2002 |
| KR | 20020009141 A | 2/2002 |
| KR | 20020013125 A | 2/2002 |
| KR | 20020027722 A | 4/2002 |
| KR | 20020055514 A | 7/2002 |
| KR | 100373092 B1 | 2/2003 |
| KR | 100373093 B1 | 2/2003 |
| KR | 20030016739 A | 3/2003 |
| KR | 100379416 B1 | 4/2003 |
| KR | 100381168 B1 | 4/2003 |
| KR | 20030075692 A | 9/2003 |
| KR | 100400464 B1 | 10/2003 |
| KR | 100403021 B1 | 10/2003 |
| KR | 20040021305 A | 3/2004 |
| KR | 20040029884 A | 4/2004 |
| KR | 20040032649 A | 4/2004 |
| KR | 100429617 B1 | 5/2004 |
| KR | 100432721 B1 | 5/2004 |
| KR | 100437057 B1 | 6/2004 |
| KR | 100457558 B1 | 11/2004 |
| KR | 100457559 B1 | 11/2004 |
| KR | 100471448 B1 | 3/2005 |
| KR | 100476448 B1 | 3/2005 |
| KR | 100484814 B1 | 4/2005 |
| KR | 100487763 B1 | 5/2005 |
| KR | 20050054716 A | 6/2005 |
| KR | 20050058799 A | 6/2005 |
| KR | 20050059883 A | 6/2005 |
| KR | 20050077657 A | 8/2005 |
| KR | 20050078301 A | 8/2005 |
| KR | 20050110147 A | 11/2005 |
| KR | 100535675 B1 | 12/2005 |
| KR | 100565482 B1 | 3/2006 |
| KR | 100593641 B1 | 6/2006 |
| KR | 100600741 B1 | 7/2006 |
| KR | 20060089854 A | 8/2006 |
| KR | 20060117703 A | 11/2006 |
| KR | 20060119580 A | 11/2006 |
| KR | 20060120799 A | 11/2006 |
| KR | 100656394 B1 | 12/2006 |
| KR | 100656400 B1 | 12/2006 |
| KR | 100657926 B1 | 12/2006 |
| KR | 100657927 B1 | 12/2006 |
| KR | 100673435 B1 | 1/2007 |
| KR | 20070012991 A | 1/2007 |
| KR | 100676764 B1 | 2/2007 |
| KR | 20070027180 A | 3/2007 |
| KR | 20070053510 A | 5/2007 |
| KR | 20070074863 A | 7/2007 |

(56) References Cited

FOREIGN PATENT DOCUMENTS

| | | | |
|---|---|---|---|
| KR | 100745804 B1 | 8/2007 | |
| KR | 20080029408 A | 4/2008 | |
| KR | 20080037129 A | 4/2008 | |
| KR | 100832492 B1 | 5/2008 | |
| KR | 20080060910 A | 7/2008 | |
| KR | 20080076381 A | 8/2008 | |
| KR | 20090045596 A | 5/2009 | |
| KR | 20090047724 A | 5/2009 | |
| KR | 100934001 B1 | 12/2009 | |
| KR | 100950734 B1 | 3/2010 | |
| KR | 100975938 B1 | 8/2010 | |
| KR | 100982260 B1 | 9/2010 | |
| KR | 101028075 B1 | 4/2011 | |
| KR | 101028502 B1 | 4/2011 | |
| KR | 101031844 B1 | 5/2011 | |
| KR | 20110050764 A | 5/2011 | |
| KR | 20110067824 A | 6/2011 | |
| KR | 20110124082 A | 11/2011 | |
| KR | 20130094047 A | 8/2013 | |
| KR | 20140000081 A | 1/2014 | |
| KR | 20140026975 A | 3/2014 | |
| KR | 20150051514 A | 5/2015 | |
| KR | 20150052690 A | 5/2015 | |
| MX | 2007002196 A | 11/2008 | |
| SE | 202073 L | 1/2004 | |
| TW | 200301047 A | 6/2003 | |
| TW | 593950 B | 6/2004 | |
| TW | 201309059 A | 2/2013 | |
| WO | 03072378 A8 | 5/2004 | |
| WO | 2012122390 A2 | 9/2012 | |
| WO | 2013189183 A1 | 12/2013 | |
| WO | 2014014862 A2 | 1/2014 | |
| WO | 2014016212 A1 | 1/2014 | |
| WO | 2014106060 A1 | 7/2014 | |
| WO | 2014183437 A1 | 11/2014 | |
| WO | 2014205243 A1 | 12/2014 | |
| WO | 2015058421 A1 | 4/2015 | |
| WO | 2016000041 A1 | 1/2016 | |
| WO | WO2016029525 A1 | 3/2016 | |
| WO | 2018082168 A1 | 5/2018 | |
| WO | 2018096127 A1 | 5/2018 | |
| WO | WO-2019038023 A1 * | 2/2019 | ......... B60H 1/00964 |
| WO | 2019082168 A1 | 5/2019 | |
| WO | 2020183367 A1 | 9/2020 | |
| WO | 2020183368 A1 | 9/2020 | |
| WO | 2022058389 A1 | 3/2022 | |
| WO | 2022058390 A1 | 3/2022 | |
| WO | 2022058391 A1 | 3/2022 | |
| WO | WO2022081206 A1 | 4/2022 | |
| WO | WO2022081207 A1 | 4/2022 | |
| WO | WO2022105851 A1 | 5/2022 | |

OTHER PUBLICATIONS

Office Action issued in EP Application No. 20197023.3 mailed on Oct. 24, 2023.
"Understanding : On/Off, Floating, Modulating/Proportional Control", retreived from internet URL: https://controltrends.org/by-industry/commercial-hvac/03/understanding-on-off-floating-modulatingproportional-control/, on Jan. 23, 2019, pp. 2, paragraph 3.
"Starting up the Truma iNet System," truma iNet System, pp. 1-8 (2015).
Ferrill, B., et al., "Swipe to Patent: Design Patents In The Age Of User Interfaces," Tech Crunch, retreived from internet URL: https://techcrunch.com/2015/08/03/swipe-to-patent-design-patents-in-the-age-of-user-interfaces/, on Dec. 12, 2018, pp. 23.
International Search Report and Written Opinion for International Application No. PCT/IB2018/058414, mailed on Jan. 31, 2019.
U.S. Appl. No. 62/578,350, filed Oct. 27, 2017 entitled "Systems, Methods, and Apparatuses for Providing Communications Between Climate Control Devices in a Recreational Vehicle".
International Search Report and Written Opinion for International Application No. PCT/EP2018/070390, mailed on Sep. 21, 2018.
U.S. Appl. No. 16/172,253 entitled "Systems, Methods, and Apparatuses for Providing Communications Between Climate Control Devices in a Recreational Vehicle" filed Oct. 26, 2018.
U.S. Appl. No. 16/641,581 entitled "Recreational Vehicle, Cooling Device, Controlling System and Method for Controlling the Cooling Device" filed Feb. 24, 2020.
Non Final office Action for U.S. Appl. No. 16/172,253, Mailed on Feb. 12, 2020.
Office Action for Germany Patent Application No. 102017214941.8 mailed on Jan. 31, 2020.
Bochner, B., "Digitization in the Mobile Home—Mobile tour into the digital future," URL: https://www.promobil.de/zubehoer/mobil-tour-in-die-digi-zukunft-digitale-kofortzone.
Heinz, D.S., "Bus Technology in the Camper—promobil explains the complex electronics," URL: https://www.promobil.de/werkstatt/elektronik-im-wohnmobil-bus-technik-und-apps.
DE Application No. 112018005002.5 filed Apr. 24, 2020 entitled "Systems, Methods, and Apparatuses for Providing Communications Between Climate Control Devices in a Recreational Vehicle".
Non Final office Action for U.S. Appl. No. 16/172,253, mailed on May 20, 2020.
Notice of Allowance for U.S. Appl. No. 16/172,253 Mailed on Oct. 26, 2020.
European Patent Application No. 20197019.1 entitled "A Recreational Vehicle User Interface" filed on Sep. 18, 2020.
European Patent Application No. 20197022.5 entitled "System and Method for Controlling at least one Function of a Vehicle" filed on Sep. 18, 2020.
European Patent Application No. 20197023.3 entitled "Devices and Method for Controlling at least one Function of a Vehicle" filed on Sep. 18, 2020.
Extended European Search Report for European Patent Application No. 20197019.1 mailed on Mar. 9, 2021.
Extended European Search Report for European Patent Application No. 20197022.5 mailed on Mar. 4, 2021.
Extended European Search Report for European Patent Application No. 20197023.3 mailed on Feb. 16, 2021.
Design U.S. Appl. No. 29/641,674, filed Mar. 23, 2018 titled "Control Panel".
Design U.S. Appl. No. 29/767,088, filed Jan. 20, 2021 titled "Control Panel".
Design U.S. Appl. No. 29/683,099, filed Mar. 11, 2019 titled Controller.
European Design Application No. 008053383-0001-0003 filed on Jul. 24, 2020.
Non Final office Action Issued in U.S. Appl. No. 16/641,581, mailed on Jun. 18, 2021.
Notice of Allowance for U.S. Appl. No. 16/641,581 Mailed on Oct. 6, 2021.
International Search Report and Written Opinion Issued in PCT Application No. PCT/EP2021/075391 mailed on Nov. 9, 2021.
International Search Report Issued in PCT Application No. PCT/EP2021/075390 mailed on Dec. 20, 2021.
U.S. Appl. No. 17/673,080 titled "Recreational Vehicle, Cooling Device, Controlling System and Method for Controlling the Cooling Device" filed Feb. 16, 2022.
PCT Application No. PCT/EP2022/056369 titled "Improved Use of Minibar Sensors" filed on Mar. 11, 2022.
Corrected Notice of Allowance Issued in U.S. Appl. No. 16/641,581 mailed on Jan. 14, 2022.
AU Application No. 2021343247 titled "A Recreational Vehicle User Interface" filed on Mar. 13, 2023.
U.S. Appl. No. 18/245,321 titled "System and Method for Controlling At Least One Function of a Recreational Vehicle" filed Mar. 14, 2023.
U.S. Appl. No. 18/245,322 titled "Devices and Methods for Securing Communication Between a Sensor and a Device" filed Mar. 14, 2023.
PCT Application No. PCT/EP2022/068965 titled "Minibar Communication" filed on Jul. 7, 2022.

(56) References Cited

OTHER PUBLICATIONS

International Search Report and Written Opinion issued in PCT Application No. PCT/EP2022/068965 mailed on Feb. 21, 2023.
PCT Application No. PCT/EP2022/068968 titled "Minibar Operation" filed on Jul. 7, 2022.
International Search Report and Written Opinion issued in PCT Application No. PCT/EP2022/068968 mailed on Feb. 20, 2023.
PCT Application No. PCT/EP2022/068970 titled "Initialisation of a Communication Device for a Minibar" filed on Jul. 7, 2022.
International Search Report and Written Opinion issued in PCT Application No. PCT/EP2022/068970 mailed on Feb. 1, 2023.
International Search Report and Written Opinion issued in PCT Application No. PCT/EP2022/056369 mailed on Nov. 9, 2022.
Office Action issued in EP Application No. 20197022.5 mailed on Jan. 19, 2024.
Office Action for Germany Patent Application No. 102017214941.8 mailed on Nov. 2, 2023.
"Stiic—Smart Touch Integrated Intelligence Control," retreived from internet URL: https://citimarinestore.com/en/dometic-marine-air-conditioner-parts/4748-stiic-smart-touch-integrated-intelligence-control-263400309.html on Dec. 12, 2018, pp. 2.
International Preliminary Report on Patentability Issued in PCT Application No. PCT/EP2021/075389 mailed on Mar. 30, 2023.
International Preliminary Report on Patentability Issued in PCT Application No. PCT/EP2021/075390 mailed on Mar. 30, 2023.
International Preliminary Report on Patentability Issued in PCT Application No. PCT/EP2021/075391 mailed on Mar. 30, 2023.
Notice of Allowance issued in U.S. Appl. No. 17/673,080 mailed on Sep. 28, 2023.
Corrected Notice of Allowability issued in U.S. Appl. No. 17/673,080 mailed on Oct. 4, 2023.
Office Action issued in EP Application No. 20197019.1 mailed on Apr. 26, 2024.
ISA/European Patent Office; International Search Report and Written Opinion for PCT/EP2021/075389 mailed Jan. 18, 2022.

\* cited by examiner

RECREATIONAL VEHICLE USER INTERFACE

CROSS REFERENCE TO RELATED APPLICATIONS

This 35 U.S.C. § 371 National Stage patent application claims priority to and benefit of PCT Patent Application No. PCT/EP2021/075389, filed Sep. 15, 2021, which claims priority to and benefit of EP 20197019.1, filed Sep. 18, 2020, all of which is incorporated herewith.

TECHNICAL FIELD

The present disclosure generally relates to the field of vehicles and, in particular, recreational vehicles or recreational vessels.

More specifically, the present disclosure relates to user interfaces, e.g. being part of a recreational vehicle monitoring and control system, for controlling at least one function of a recreational vehicle or a recreational vessel.

BACKGROUND

Recreational vehicles, commonly abbreviated RV, are vehicles which include living quarters for accommodation. Various types of recreational vehicles include, e.g., a motorhome, a campervan, a caravan, a fifth-wheel trailer, a pop-up camper, or a truck camper.

In recent years, the development of recreational vehicles, and their functions, has been intense. Nowadays, recreational vehicles are becoming increasingly complex, and more and more functions are added. These functions may include, but are not limited to, HVAC (Heat, Ventilation and Air-Conditioning) related functions, security alarm functions, light control functions, etc. Conventionally, the various functions have been controlled individually. That is, each function is controllable by a dedicated control device such that all controllable functions have different control devices.

When more and more functions are added to the recreational vehicle, the number of control devices also increases. This may result in an excessive number of control devices to control the many functions to be controlled in the recreational vehicle. This may be perceived as cumbersome by some users of the recreational vehicles.

SUMMARY

It is in view of the above considerations and others that the various embodiments have been made by the inventors.

The present disclosure recognizes the fact that there is a need for an improved method and a corresponding user interface for controlling one or more functions in a recreational vehicle.

It is therefore a general object of the embodiments described herein to provide an improved method and a corresponding user interface for controlling at least one function of a recreational vehicle. It would be advantageous if the method and the user interface allows for controlling one or multiple functions flexibly. Additionally, or alternatively, it would be advantageous if the method and the user interface allows for controlling one or multiple functions without inducing unnecessary complexity to a user who desires to control said function(s). As will be appreciated, it would therefore also be advantageous if the method and the user interface improve the user-friendliness compared to the existing art described in the background.

The above-mentioned general object has been addressed by the appended independent claims. Advantageous embodiments are described in the appended dependent claims.

In a first of its aspects, the present disclosure presents a method implemented in a Recreational Vehicle User Interface (RVUI) for controlling at least one function of a recreational vehicle (RV). The RVUI may be part of, or otherwise comprised in, a RV monitoring and control system of the RV.

The method comprises displaying, at a touchscreen of the RVUI, a circular-shaped user input element; and detecting, at the touchscreen of the RVUI, a user input comprising a movement along the displayed circular-shaped user input element, the movement being indicative of a request to control a user-selected function of the recreational vehicle; and responsive to detecting said user input initiating control of the user-selected function.

The method may additionally comprise transmitting a control signal representative of the user-selected function to a processor for control of the user-selected function. The control signal may be transmitted wirelessly or via a wired connection.

In some embodiments, the method may additionally comprise animating, at the touchscreen of the RVUI, rotational movement of the user input along the displayed circular-shaped user input element in a manner that corresponds to the user movement.

Additionally, or alternatively, the method may comprise providing tactile feedback along the displayed circular-shaped user input element in a manner such that a user can sense his/her movement along the displayed circular-shaped user input element.

In some embodiments, the user-selected function may include any one or a combination of: a climate control function, a heater function, a ventilation function, a water heater function, a vehicle battery function, a light control function, and a security alarm function.

In some embodiments, the user-selected function may be selected prior to the detecting of said user input.

In some embodiments, the method may comprise providing, at the RVUI, at least one input region configured to receive a pressing input, the at least one input region being physically depressible upon receiving the pressing input thereat; wherein detecting a pressing input being indicative of a request to select said user-selected function of the recreational vehicle. In alternative embodiments, the method may comprise: displaying, at the touchscreen of the RVUI, at least one input region; and detecting a momentary pressing at the at least one input region and responsive thereto selecting said user-selected function of the recreational vehicle. For example, the momentary pressing may include a tap or a short press of the at least one input region.

In a second of its aspects, the present disclosure presents a Recreational Vehicle User Interface (RVUI) for controlling at least one function of a recreational vehicle (RV). The RVUI may be part of, or otherwise comprised in, a RV monitoring and control system of the RV.

The RVUI comprises a touchscreen configured to display a circular-shaped user input element; wherein the touchscreen is configured to detect a user input comprising a movement along the displayed circular-shaped user input element, the movement being indicative of a request to control a user-selected function of the recreational vehicle;

and wherein the RVUI is further configured to initiate control of the user-selected function responsive to detecting said user input.

In some embodiments, the RVUI may additionally be configured to transmit a control signal representative of the user-selected function to a processor for control of the user-selected function. The control signal may be transmitted either wirelessly or via a wired connection.

In some embodiments, the touchscreen may be configured to animate rotational movement of the user input along the displayed circular-shaped user input element in a manner that corresponds to the user movement.

Additionally, or alternatively, the touchscreen may be configured to provide tactile feedback along the displayed circular-shaped user input element in a manner such that a user can sense his/her movement along the displayed circular-shaped user input element. The tactile feedback could, e.g., be implemented by using a vibration-creating device (e.g., a motor or the like) that is configured to create vibrations in response to user input in the form of the movement along the displayed circular-shaped user input element.

In some embodiments, the user-selected function may include any one or a combination of: a climate control function, a heater function, a ventilation function, a water heater function, a vehicle battery function, a light control function, and a security alarm function.

In some embodiments, the RVUI may comprise at least one input region configured to receive a pressing input, the at least one input region being physically depressible upon receiving the pressing input thereat; wherein the pressing input is indicative of a request to select said user-selected function of the recreational vehicle.

In some embodiments, the touchscreen of the RVUI may be configured to display at least one input region; wherein the touchscreen of the RVUI may be further configured to detect a momentary pressing at the at least one input region and responsive thereto to select said user-selected function of the recreational vehicle. For example, the momentary pressing may include a tap or a short press of the at least one input region.

In a third of its aspects, the present disclosure presents a user interface panel comprising the RVUI according to the second aspect. The user interface panel is attachable to a surface of the recreational vehicle. For example, the user interface panel may be removably attachable to the surface of the recreational vehicle.

In a fourth of its aspects, the present disclosure presents a recreational vehicle comprising the user interface panel according to the third aspect.

For example, the recreational vehicle may be a recreational vehicle selected from the group consisting of: a motorhome, a campervan, a caravan, a fifth-wheel trailer, a pop-up camper, a truck camper.

In a fifth of its aspects, the present disclosure presents a computer program, comprising instructions which, when executed on at least one processor, cause the at least one processor to carry out the method according to the first aspect. Furthermore, a carrier comprising the computer program of the fifth aspect may be provided. The carrier may for example be one of an electronic signal, an optical signal, a radio signal or non-transitory computer readable storage medium.

The various aspects and embodiments provide an improved method and a corresponding RVUI for controlling one or several functions of a recreational vehicle. Some aspects and embodiments allow for controlling one or multiple functions of the RV flexibly. For example, some aspects and embodiments allow for controlling one or multiple functions without inducing unnecessary complexity to a user who desires to control said function(s). Compared to the existing art, the proposed embodiments may be perceived as more user-friendly by some users.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION OF EMBODIMENTS

The present embodiments will now be described more fully hereinafter. The present embodiments may, however, be embodied in many different forms and should not be construed as limited to the embodiments set forth herein; rather, these embodiments are provided by way of example so that this disclosure will be thorough and complete, and will fully convey the scope of the claims to those persons skilled in the art. Like reference numbers refer to like elements throughout the description.

As described earlier, conventional ways of controlling one or more functions of a recreational vehicle (RV) may be inadequate—in particular in view of today's and future needs that demand increasingly many functions to be controlled in said vehicle.

The inventors have realized that here is a need for an improved method and a corresponding user interface for controlling one or more functions in a recreational vehicle.

The same need has also been identified for recreational vessels such as yachts. In the following description, however, the aspects and embodiments will be described with reference to recreational vehicles (RVs).

To address the above-mentioned need, and in accordance with an aspect, described herein are a method implemented in a RVUI and a corresponding RVUI for controlling at least one function (i.e., one or several functions) of a recreational vehicle.

A circular-shaped user input element is displayed at a touchscreen of the RVUI. Furthermore, a user input is detected at the touchscreen of the RVUI. This user input comprises a movement along the displayed circular-shaped user input element. The movement is indicative of a request to control a user-selected function of the recreational vehicle. Responsive to detecting this user input, control of the user-selected function is initiated, or otherwise triggered. In some embodiments, a control signal representative of the user-selected function is transmitted, i.e. sent, to a processor for control of the user-selected function. The control signal may be transmitted wirelessly or over a wired connection.

As will be appreciate upon reading the following description, the RVUI may allow for controlling one or multiple functions of the RV flexibly. Additionally, or alternatively, the RVUI may allow for controlling one or multiple functions without inducing unnecessary complexity to a user who desires to control said function(s). The RVUI may additionally, or alternatively, allow for a user-friendly man-machine interaction when the user interacts and operates the RVUI to control various functions of the RV.

Figure 1A:
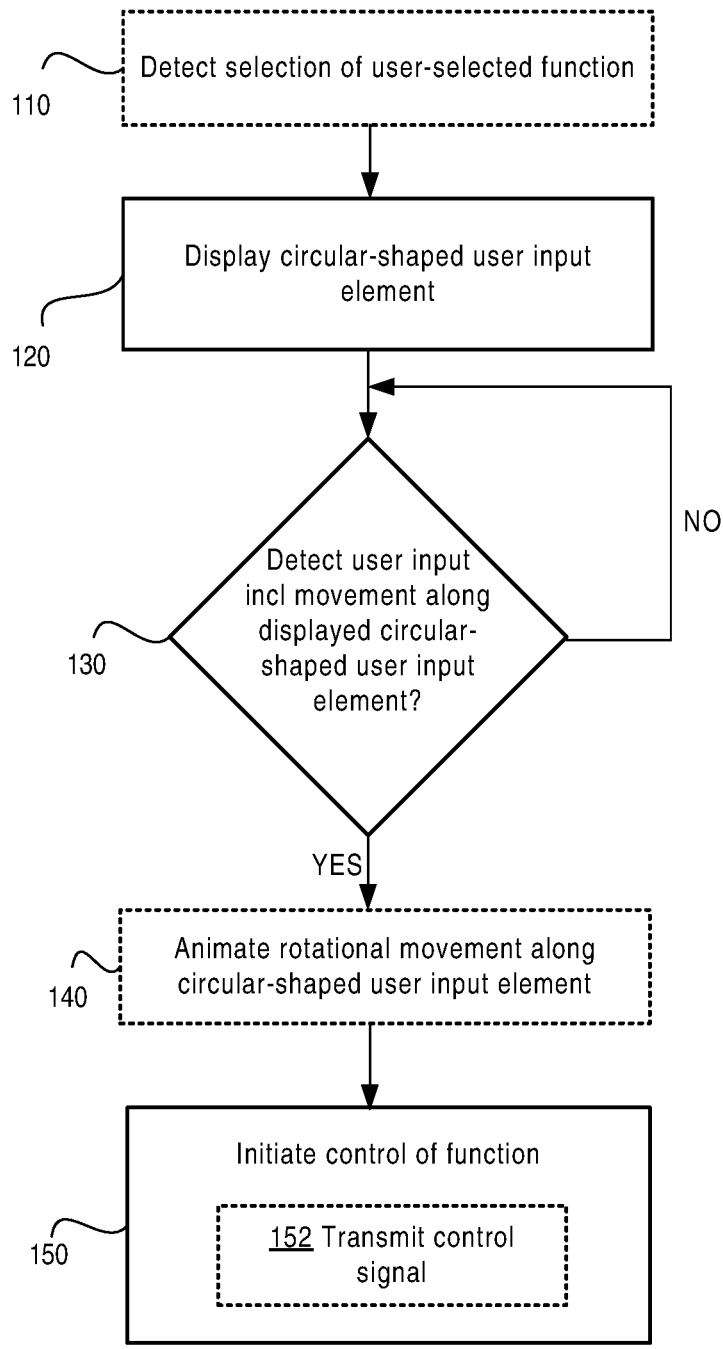
FIGS. 1A-1C illustrate flowcharts of a method according to some embodiments.
Figure 1B:
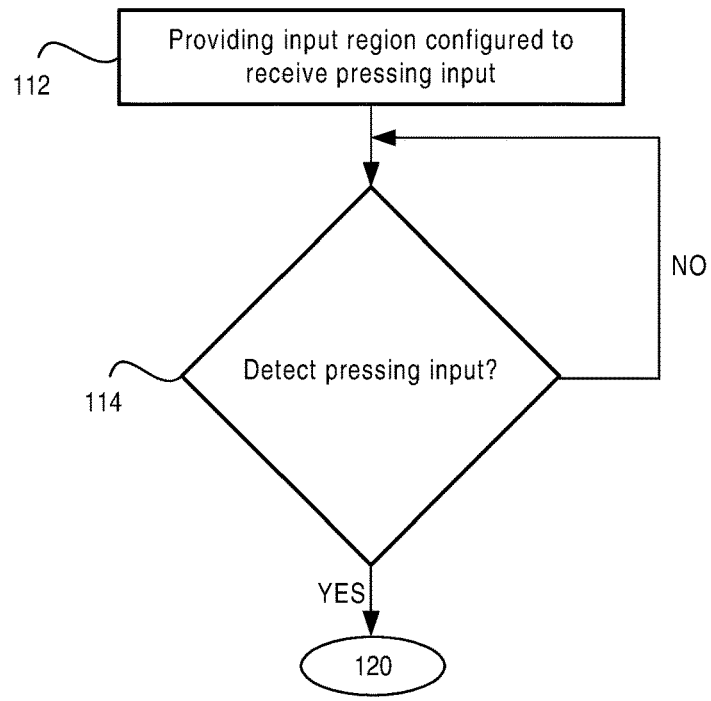
Figure 1C:
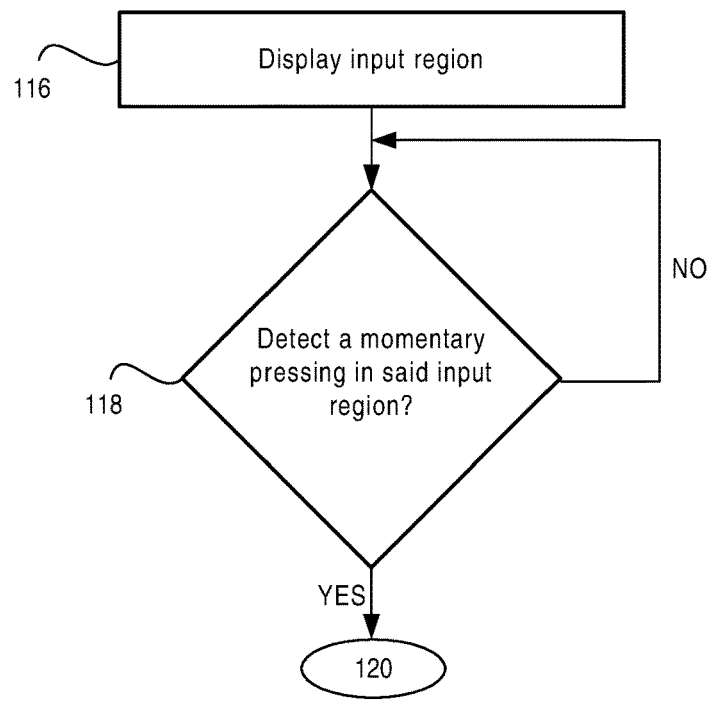

Reference is now made to FIGS. 1A-1C, which illustrate an example embodiment of a method.

It should be appreciated that the actions do not necessarily have to be performed, or otherwise executed, in the exact order as will be described in the following. However, in advantageous embodiments the actions may be performed in the exact order as described with reference to FIGS. 1A-1C.

Action 110: A selection of a user-selected function may be detected or otherwise sensed.

The user-selected function is a function of the RV to be controlled. The user-selected function may thus, for instance, include any one or a combination of a climate control function, a heater function, a ventilation function, a water heater function, a vehicle battery function, a light control function, and a security alarm function, etcetera.

FIGS. 1B and 1C illustrate two examples of the selection of a user-selected function in action 110. Reference is first made to FIG. 1B.

Action 112: One or more input regions may be provided. Each one of the one or more input regions may be associated with a selectable function. The input region(s) is/are physically depressible upon receiving the pressing input thereat. The input region(s) is/are also configured to receive a pressing input.

Action 114: A pressing input may be detected or otherwise sensed. The detection of a pressing input may be indicative of a request to select said user-selected function of the recreational vehicle, i.e. the function associated with the input region in question.

Reference is now made to FIG. 1C.

Action 116: One or more input regions may be displayed at the touchscreen of the RVUI. Each one of the one or more input regions may be associated with a selectable function.

Action 118: A momentary pressing may be detected or otherwise sensed at an input region. Responsive thereto, i.e. responsive to the detection of the momentary pressing at the input region in question, said user-selected function of the recreational vehicle (i.e., the function associated with the input region in question) is selected.

It should be appreciated that a momentary pressing is a pressing with a limited duration. In other words, a momentary pressing has a duration which is shorter than a maintained pressing. A maintained pressing is a pressing, which has a duration which is typically longer than a certain, e.g. pre-defined, threshold time period—such as longer than 1, 2 or 3 seconds. Therefore, a momentary pressing typically has a shorter duration than a corresponding duration of a maintained pressing—such as shorter than 1, 2 or 3 seconds. That is, if or when a maintained pressing is defined as a pressing with a duration of at least two seconds a corresponding momentary pressing would be defined as having a duration which is equal to or shorter than said two seconds. Similarly, if or when a maintained pressing is defined as a pressing with a duration of at least one second a corresponding momentary pressing would be defined as having a duration which is equal to or shorter than said one second. The momentary pressing may thus include a tap or a short press of the input region in question. Reference is now made to FIG. 1A again.

Action 120: A circular-shaped user input element is displayed at a touchscreen of the RVUI.

In some embodiments, action 120 may advantageously be made conditional on action 110. That is, action 120 is then only initiated responsive to a selection of a user-selected function having been detected or sensed in a previous action 110.

Action 130: It may be checked or otherwise determined whether a user input is detected or otherwise sensed at the touchscreen of the RVUI. Typically, but not necessarily, this is checked continuously.

As will be appreciated, a user input my thus be detected or otherwise sensed. This user input comprises a movement along the displayed circular-shaped user input element. The movement along the displayed circular-shaped user input element is indicative of a request to control a user-selected function of the recreational vehicle.

Action 140: Optionally, the rotational movement of the user input along the displayed circular-shaped user input element may be animated at the touchscreen of the RVUI in a manner that corresponds to the user movement. This has the advantage of providing the user with visual feedback, which credibly assists the user in his/her further interaction with the RVUI.

Additionally, or alternatively, the touchscreen may be configured to provide tactile feedback along the displayed circular-shaped user input element in a manner such that a user can sense his/her movement along the displayed circular-shaped user input element. The tactile feedback could, e.g., be implemented by using a vibration-creating device (e.g., a motor or the like) that is configured to create vibrations in response to user input in the form of the movement along the displayed circular-shaped user input element.

Action 150: Responsive to detecting said user input in action 130, control of the user-selected function is initiated or otherwise triggered.

Action 152: A control signal representative of the user-selected function may be transmitted, i.e. sent, to a processor for control of the user-selected function. Advantageously, the control signal may be transmitted to the processor wirelessly. Alternatively, the control signal may be transmitted to the processor via a wired connection.

Figure 2:
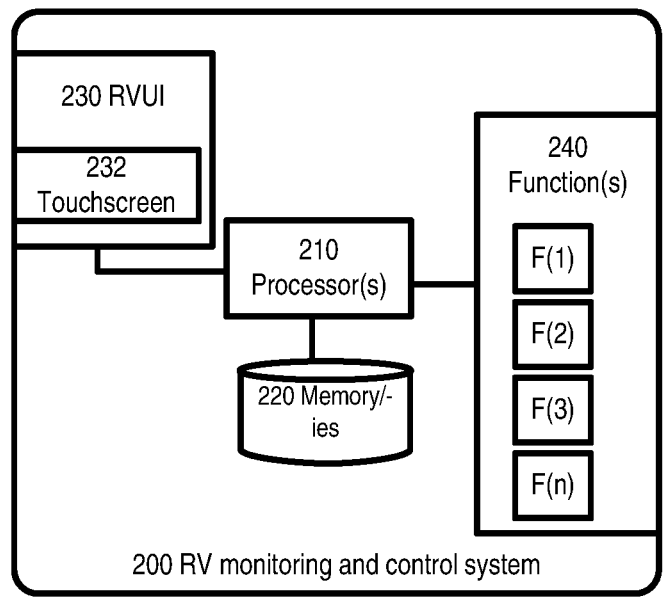
FIG. 2 illustrates an example implementation of a RV monitoring and control system including a RVUI.
Figure 5:
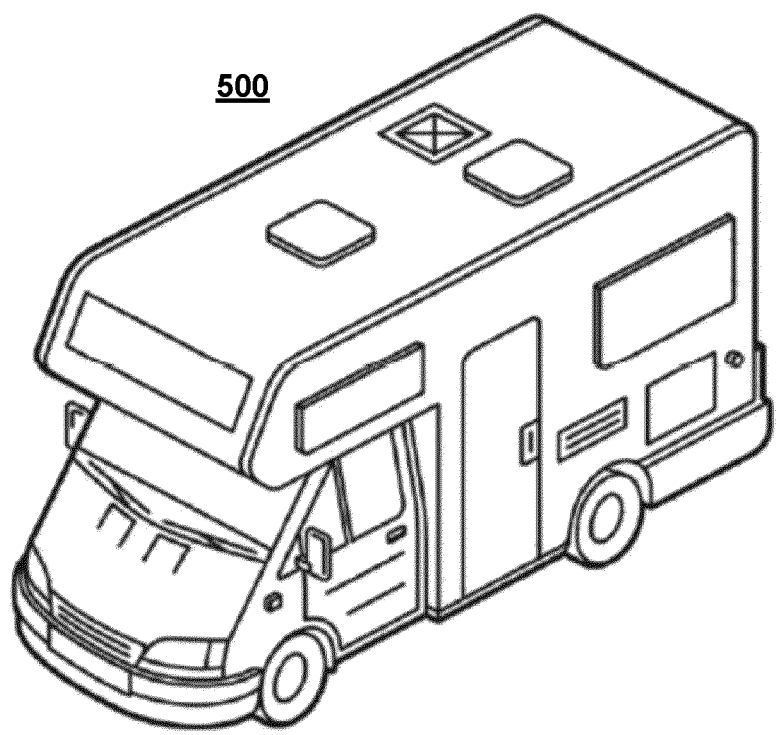
FIG. 5 illustrates an example of a RV, such as a motorhome.

With reference to FIG. 2, an example implementation of a Recreational Vehicle User Interface (RVUI) 230 will now be described in further detail. The RVUI 230 is configured to control at least one function of a RV 500 (FIG. 5). The RVUI 230 of FIG. 2 may be operable to perform, or otherwise execute, the methods as described hereinabove with respect to FIGS. 1A-1C. As described earlier, RVs 500 are vehicles, which include living quarters for accommodation. Various types of RVs 500 include, e.g., a motorhome, a campervan, a caravan, a fifth-wheel trailer, a pop-up camper, or a truck camper. For example, the RVUI 230 may be part of a RV monitoring and control system 200 of a RV 500, such as a motorhome (see FIG. 5).

As is schematically illustrated in FIG. 2, a RV monitoring and control system 200 may comprise hardware resources 210, 220, 230, 240. For example, the RV monitoring and control system 200 may comprise one or more processors 210 and one or more memories 220. The RV monitoring and control system 200 may further comprise the RVUI 230. The RVUI 230 includes a touchscreen, i.e. a touch-sensitive display upon which virtual keys may be displayed and operated. Additionally, or alternatively, the RVUI 230 may be operable to issue and/or receive voice commands.

According to advantageous embodiments, the RVUI 230 comprises a touchscreen 232, which is configured to display a circular-shaped user input element. The touchscreen 232 is configured to detect, or otherwise sense, a user input comprising a movement along the displayed circular-shaped user input element, wherein the movement is indicative of a request to control a user-selected function 240 of the RV. The user-selected function 240 may for example be any one or a combination of: a climate control function F(1), a heater function F(2), a ventilation function F(3), a water heater function F(4), a vehicle battery function F(5), a light control function F(6), and a security alarm function F(7), etcetera. Furthermore, the RVUI 230 is configured to initiate control of the user-selected function responsive to detecting said user input.

Furthermore, the RVUI 230 may be configured to transmit a control signal representative of the user-selected function to the processor(s) 210 to control the user-selected function 240. For example, the RVUI 230 may be configured to transmit the control signal to the processor(s) 210 wirelessly, e.g., using any suitable short-range technology such as Bluetooth®, Wi-Fi, WiMax, ZigBee, Near-Field Communication (NFC), to name only a few examples. Additionally, or alternatively, the RVUI 230 may be configured to transmit the control signal to the processor(s) 210 via a wired connection. As will be appreciated, the memory/-ies 220 typically comprise(s) instructions executable by the processor(s) 210 whereby the RV monitoring and control system 200 is operative to control function(s) 240 of the RV.

In some embodiments, the touchscreen 232 of the RVUI 230 may advantageously be configured to animate rotational movement of the user input along the displayed circular-shaped user input element in a manner that corresponds to the user movement. Additionally, or alternatively, the touchscreen may be configured to provide tactile feedback along the displayed circular-shaped user input element in a manner such that a user can sense his/her movement along the displayed circular-shaped user input element. The tactile feedback could, e.g., be implemented by using a vibration-creating device (e.g., a motor or the like) that is configured to create vibrations in response to user input in the form of the movement along the displayed circular-shaped user input element.

In some embodiments, the RVUI 230 may include at least one input region configured to receive a pressing input. The at least one input region may be physically depressible upon receiving the pressing input thereat. This pressing input may for example be indicative of a request to select said user-selected function 240 of the RV 500. In some embodiments, the touchscreen 232 of the RVUI 230 may additionally, or alternatively, be configured to display at least one input region. The touchscreen 232 of the RVUI 230 may be configured to detect a momentary pressing at the at least one input region and responsive thereto to select said user-selected function of the RV. As described earlier herein, a momentary pressing is a pressing with a limited duration and may include a tap or a short press of the at least one input region.

Figure 3:
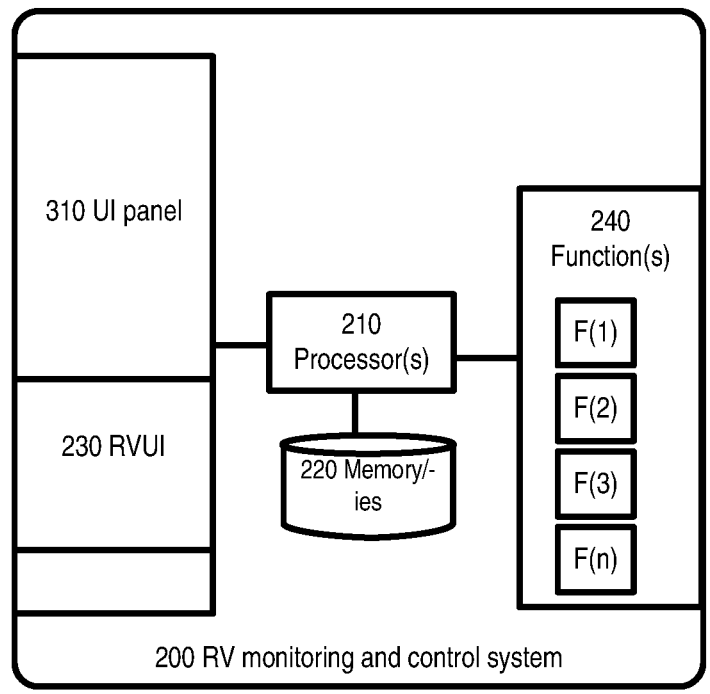
FIG. 3 illustrates another example implementation of a RV monitoring and control system including a user interface panel.

Reference is now made to FIG. 3, which illustrates another embodiment. This embodiment is similar to the embodiment described in conjunction with FIG. 2. Like reference numbers therefore refer to like elements. All details will therefore not be repeated here. In the embodiment of FIG. 3, there is provided a user interface (UI) panel 310. The UI panel includes a RVUI 230 as described with reference to FIG. 2. As such, the UI panel 310 may be part of a RV monitoring and control system 200 for monitoring and controlling functions 240 of a RV 500 (FIG. 5).

Figure 4:
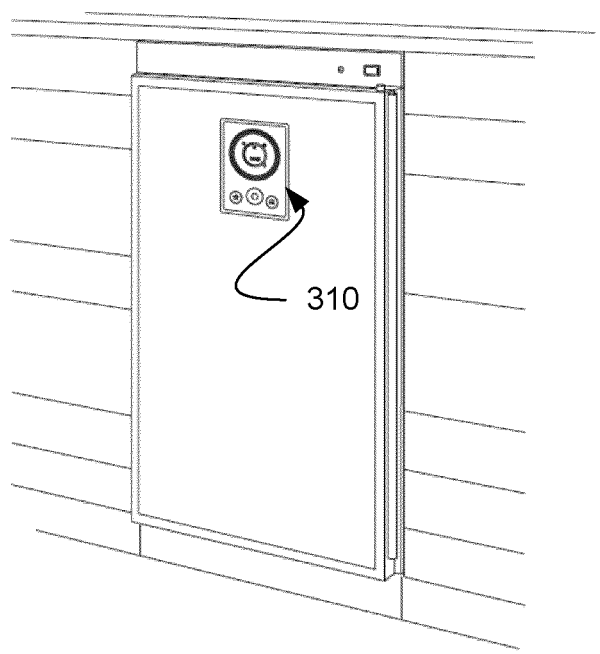
FIG. 4 illustrates an example embodiment where the user interface panel including the RVUI is attached to a structure of a RV.

Reference is now made to FIG. 4. FIG. 4 schematically illustrates an example where the UI panel 310 is attached to a surface of the RV 500 (FIG. 5). In some embodiments, the UI panel 310 may be removably attached to the surface of the RV 500. As will be appreciated, the RV 500 may hence comprise the UI panel 310.

Figure 6:
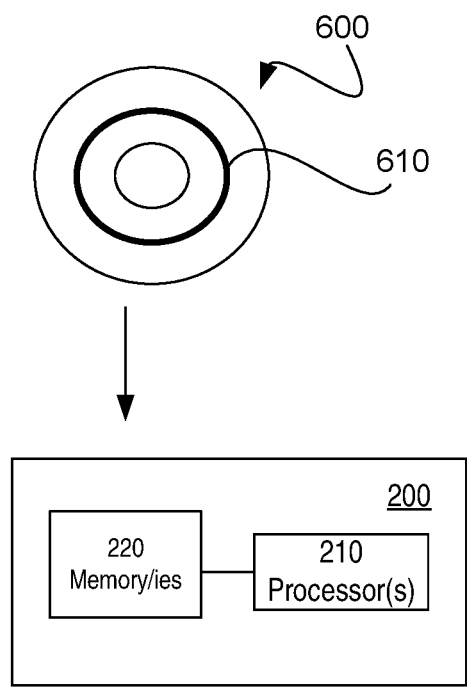
FIG. 6 illustrates a carrier containing a computer program, in accordance with some embodiments.

Turning now to FIG. 6, another aspect will be briefly discussed. FIG. 6 shows an example of a computer-readable medium, in this example in the form of a data disc 600. In one embodiment, the data disc 600 is a magnetic data storage disc. The data disc 600 is configured to carry instructions 610 that can be loaded into a data storage (e.g., memory (e.g. a Solid State Disc (SSD) memory)) of an apparatus (e.g., the RV monitoring and control system 200 in FIG. 3 or 4). Upon execution of said instructions by a processor of the apparatus, the apparatus is caused to execute a method or procedure as described in connection with FIGS. 1A-1C. The data disc 600 is arranged to be connected to or within and read by a reading device (not shown), for loading the instructions into the processor. One such example of a reading device in combination with one (or several) data disc(s) 600 is a hard drive. It should be noted that the computer-readable medium can also be other mediums such as compact discs, digital video discs, flash memories or other memory technologies commonly used. In such an embodiment, the data disc 600 is one type of a tangible computer-readable medium. The instructions may alternatively be downloaded to a computer data reading device, such as a computer or other media device capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 7A:
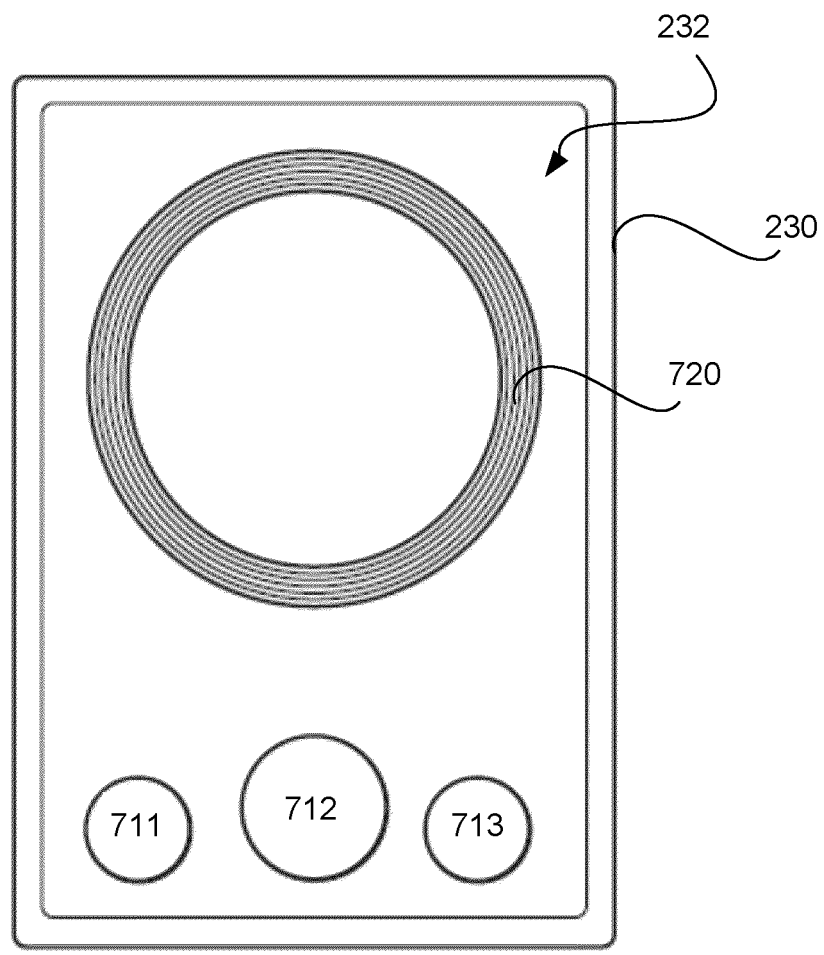
FIGS. 7A-7B illustrate various conceivable example embodiments of a RVUI.
Figure 7B:
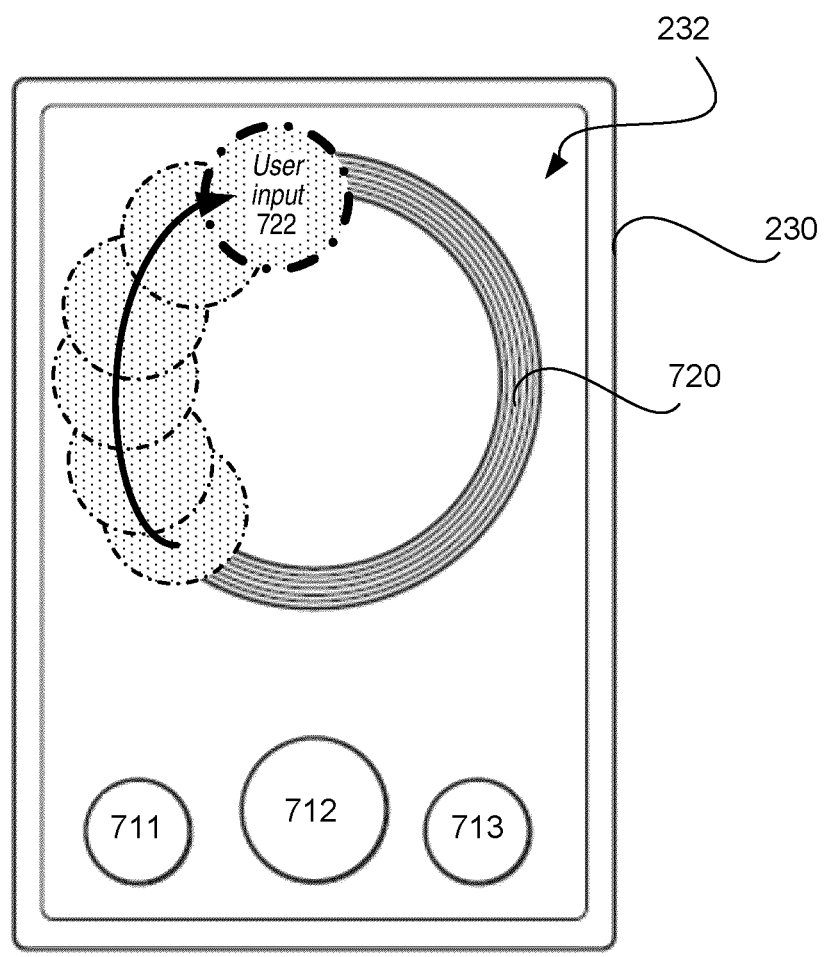

Reference will now be made to FIGS. 7A-7B, which illustrate various conceivable example embodiments of the RVUI 230 described hitherto.

In some embodiments, the RVUI 230 may be part of a user interface panel, which is removably attachable to a surface of a recreational vehicle, such as a motorhome, a campervan, a caravan, a fifth-wheel trailer, a pop-up camper, a truck camper.

The RVUI includes a touchscreen 232 as described earlier. As can be seen in FIG. 7A, the touchscreen 232 of the RVUI 232 may be configured to display one or more input regions 711, 712 and 713, e.g. displayed as virtual keys or buttons. Each one of the input regions 711, 712, 713 may, e.g., be configured to detect a momentary pressing at the input region in question and responsive thereto interpret the momentary pressing as a selection of a function associated with the thus pressed input region 711, 712, 713. Again, a momentary pressing is typically pressing with a limited duration as described earlier herein. The momentary pressing may thus include a tap or a short press of the input region in question. As will be appreciated, a user may thus interact with the RVUI 230 and issue requests by momentarily pressing an input region 711, 712, 713. In alternative embodiments, the input regions can instead be provided as physical keys or buttons. That is, the input regions are not necessarily provided as virtual keys or buttons of the touchscreen. The input region(s) may be configured to receive a pressing input, whereby the input region(s) is/are physically depressible upon receiving the pressing input thereat; wherein the pressing input is indicative of a request to select a function associated with the thus pressed input region.

The touchscreen 232 is configured to display a circular-shaped user input element 720. Reference is now also made to FIG. 7B, which schematically illustrates an exemplary user input movement 722 along at least part of the displayed circular-shaped user input element 720. The touchscreen 232 is configured to recognize user input 722 in the form of a movement, for example the movement of a user's finger (or a stylus) upon the touch-sensitive display (touchscreen) 232. A user may thus interact with the touchscreen 232 and provide user input 722, e.g., by moving the user's finger (or a stylus) along the displayed circular-shaped user input element 720. In other words, the touchscreen 232 is configured to sense or otherwise detect a user input 722 including a movement along at least part of the displayed circular-shaped user input element 720, wherein the movement along the displayed circular-shaped user input element is indicative of a request to control a user-selected function of the recreational vehicle. In response to sensing or otherwise detecting a user input 722, the RVUI 230 is configured to initiate control of the user-selected function.

Reference is now made to FIGS. 8A-8E, which illustrate a sequence of actions when a user interacts with and operates an exemplary RVUI 230 as described in connection with FIGS. 7A-7B.

Figure 8A:
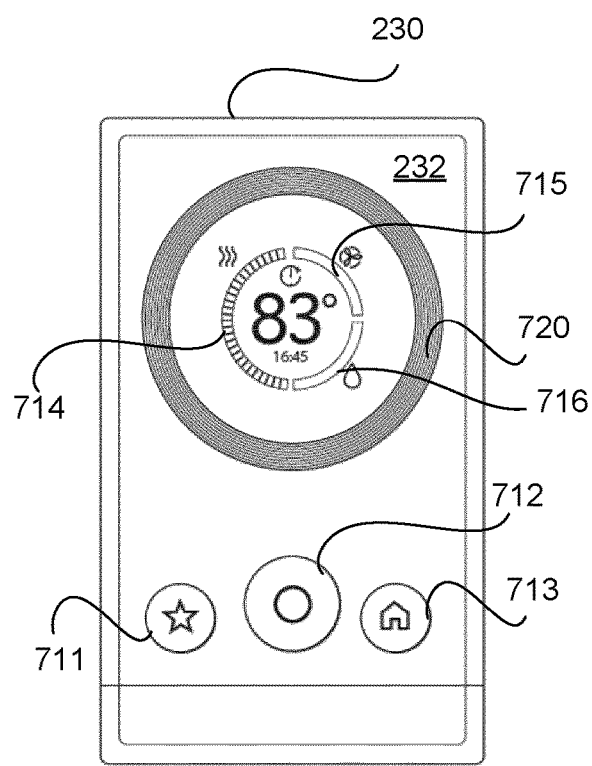
FIGS. 8A-8E illustrates various example view of a RVUI according to some embodiments.

FIG. 8A schematically illustrates an example view of the RVUI 230. In this example, multiple input regions 711, 712, 713, 714, 715, 716 are provided. Each one of the input regions 711-716 may, e.g., be configured to detect a momentary pressing at the input region in question and responsive thereto interpret the momentary pressing as a selection of a function associated with the thus pressed input region 711-716. Again, a momentary pressing is typically pressing with a limited duration as described earlier herein. The momentary pressing may thus include a tap or a short press of the input region 711-716 in question. As will be appreciated, a user may thus interact with the RVUI 230 and issue requests by momentarily pressing any one of the input regions 711-716.

Figure 8B:
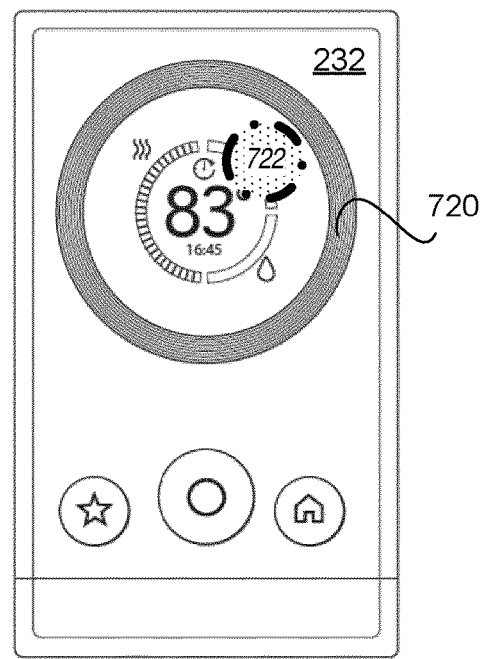

For example, and with reference to FIG. 8B, a user may interact with the touchscreen 232 of the RVUI 230 by momentarily pressing 722 the input region, or input area, 715 to select a function of the RV to be controlled, here exemplified by a fan function. For example, the touch screen 232 may be configured to detect a momentary pressing 722 at the input region 715 and responsive thereto interpret the momentary pressing as a selection of the fan function. The RVUI 230 may also be configured to transmit a control signal representative of the user-selected function, i.e. the fan function in this example, to a processor(s) 210 for continued control of the user-selected function. As described earlier, the control signal may be transmitted wirelessly or over a wired connection to the processor(s) 210. Furthermore, responsive to a user input (e.g. a tap) indicative of a request to select the fan function, the touchscreen may be configured to adjust or otherwise change the visual appearance of the display area 730 (FIG. 8C).

Figure 8C:
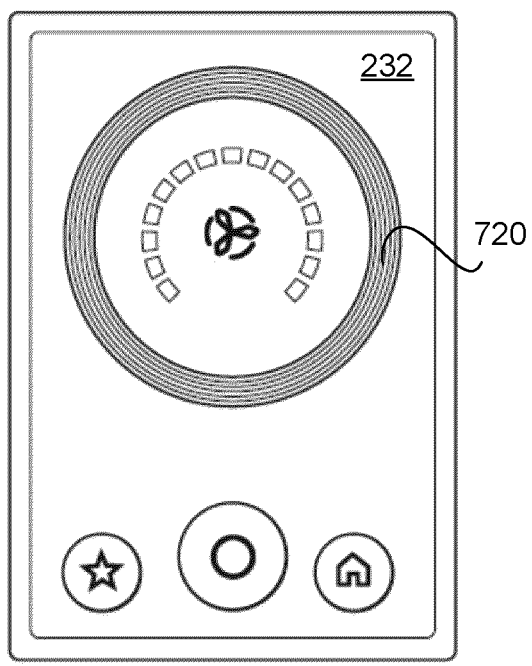
Figure 8D:
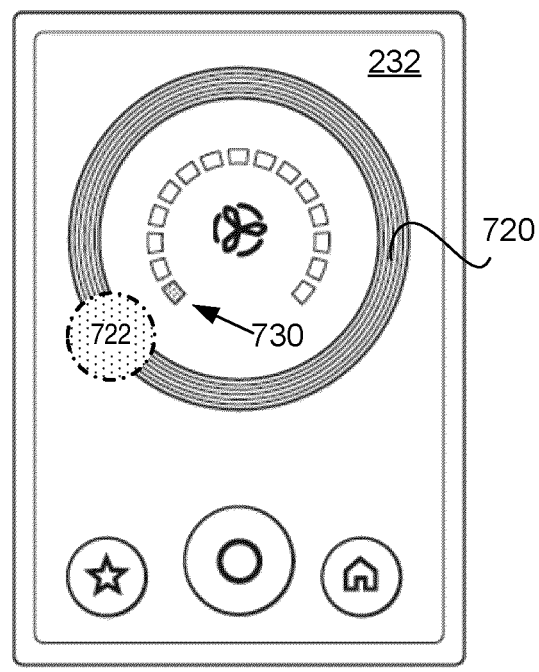
Figure 8E:
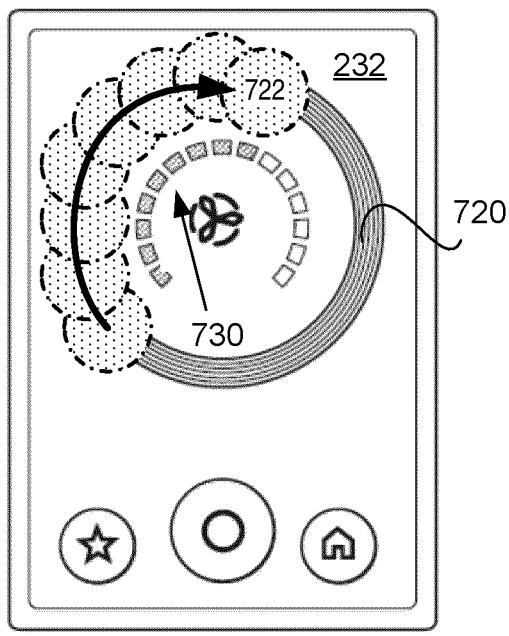

Reference is now made to FIG. 8C, which illustrates an exemplary visual appearance of the touchscreen 232 of the RVUI 230 when a user has selected the user-selected function—e.g., the fan function in this example. As can be seen in FIGS. 8B-8C, a user may interact with and operate the fan function by providing a user input 722 in the form of a movement along at least part of the displayed circular-shaped user input element 720. A movement along the displayed circular-shaped user input element 720 is indicative of a request to control the user-selected function, i.e. the fan function in this example, of the RV. Advantageously, but not necessarily, the touchscreen 232 of the RVUI 230 may be configured to animate 730 rotational movement of the user input along, or as in this example at, the displayed circular-shaped user input element in a manner that corresponds to the user movement. This gives the user who interacts with and operates the touchscreen visual feedback when the user controls the user-selected function, e.g. the fan function in this case. Responsive to detecting or sensing the user input, control of the user-selected function may be initiated or otherwise triggered accordingly. Furthermore, a control signal representative of the user-selected function may be transmitted, either wirelessly or over a wired connection, to a processor for control of the user-selected function in accordance with the user input at the touchscreen 232.

In FIGS. 8A-8E, the input region(s) 711, 712, 713 have been described to be, e.g., virtual keys or buttons. In alternative embodiments, it is conceivable to provide these input region(s) 711, 712, 713 in the form of physical buttons, which are configured to receive a pressing input.

The various aspects and embodiments provide an improved method and a corresponding RVUI for controlling one or several functions of a recreational vehicle. Some aspects and embodiments allow for controlling one or multiple functions of the RV flexibly. For example, some aspects and embodiments allow for controlling one or multiple functions without inducing unnecessary complexity to a user who desires to control said function(s). Compared to the existing art, the proposed embodiments and aspects may be perceived as more user-friendly by some users. For example, the proposed embodiments may be perceived as user-friendly in that they allow the control of many functions from one single location, the RVUI. This also enables a more time efficient way of controlling multiple functions—instead of requiring a user to move to the different physical buttons within the RV to control the different functions of the RV. Still further, the proposed embodiments and aspects are intuitive in that the user can receive visual feedback and can confirm that the desired functions are selected and controlled in a desired manner. Moreover, the RVUI may be part of a user interface panel which can advantageously be positioned, or placed, at a desired and thus easily accessible place, e.g. at a structure of the user's choice. In addition, and in contrast to physical buttons or rotatable knobs which are sometimes used in the prior art, a circular-shaped input element displayed at a touchscreen of the RVUI is more resistant towards wear damages.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while the embodiments have been described with reference to recreational vehicles, persons skilled in the art will appreciate that the embodiments may equivalently be applied to recreational vessels as is outlined below in the list of numbered example embodiments. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a certain combination of features is not feasible and/or advantageous. In addition, singular references do not exclude a plurality. Finally, reference signs in the claims are provided merely as a clarifying example and should not be construed as limiting the scope of the claims in any way.

NUMBERED EXAMPLE EMBODIMENTS

The technology described throughout this disclosure thus encompasses without limitation the following numbered example embodiments:

NEE1. A method implemented in a Recreational Vehicle User Interface (RVUI), for controlling at least one function of a recreational vehicle, the method comprising:
  displaying, at a touchscreen of the RVUI, a circular-shaped user input element; and
  detecting, at the touchscreen of the RVUI, a user input comprising a movement along the displayed circular-shaped user input element, the movement being indicative of a request to control a user-selected function of the recreational vehicle; and responsive to detecting said user input
  initiating control of the user-selected function.

NEE2. The method according to embodiment NEE1, comprising:
  transmitting a control signal representative of the user-selected function to a processor for control of the user-selected function.

NEE3. The method according to embodiment NEE2, wherein the control signal is transmitted to the processor wirelessly.

NEE4. The method according to any one of the embodiments NEE1-NEE3, comprising:
  animating, at the touchscreen of the RVUI, rotational movement of the user input along the displayed circular-shaped user input element in a manner that corresponds to the user movement.

NEE5. The method according to any one of the embodiments NEE1-NEE4, wherein the user-selected function includes any one or a combination of: a climate control function, a heater function, a ventilation function, a water heater function, a vehicle battery function, a light control function, and a security alarm function.

NEE6. The method according to any one of the embodiments NEE1-NEE5, wherein the user-selected function is selected prior to the detecting of said user input.

NEE7. The method according to embodiment NEE6, comprising:
  providing, at the RVUI, at least one input region configured to receive a pressing input, the at least one input region being physically depressible upon receiving the pressing input thereat; wherein
  detecting a pressing input being indicative of a request to select said user-selected function of the recreational vehicle.

NEE8. The method according to embodiment NEE6, comprising:
  displaying, at the touchscreen of the RVUI, at least one input region; and
  detecting a momentary pressing at the at least one input region and responsive thereto selecting said user-selected function of the recreational vehicle.

NEE9. The method according to embodiment NEE8, wherein the momentary pressing includes a tap or a short press of the at least one input region.

NEE10. A Recreational Vehicle User Interface (RVUI) for controlling at least one function of a recreational vehicle, the RVUI comprising:
  a touchscreen configured to display a circular-shaped user input element; wherein
  the touchscreen is configured to detect a user input comprising a movement along the displayed circular-shaped user input element, the movement being indicative of a request to control a user-selected function of the recreational vehicle; and wherein
  the RVUI is further configured to initiate control of the user-selected function responsive to detecting said user input.

NEE11. The RVUI according to embodiment NEE10, wherein the RVUI is configured to transmit a control signal representative of the user-selected function to a processor for control of the user-selected function.

NEE12. The RVUI according to embodiment 11, wherein the RVUI is configured to transmit the control signal to the processor wirelessly.

NEE13. The RVUI according to any one of the embodiments NEE10-NEE12, wherein the touchscreen is configured to animate rotational movement of the user input along the displayed circular-shaped user input element in a manner that corresponds to the user movement.

NEE14. The RVUI according to any one of the embodiments NEE10-NEE13, wherein the user-selected function includes any one or a combination of: a climate control function, a heater function, a ventilation function, a water heater function, a vehicle battery function, a light control function, and a security alarm function.

NEE15. The RVUI according to any one of the embodiments NEE10-NEE14, comprising:
  at least one input region configured to receive a pressing input, the at least one input region being physically depressible upon receiving the pressing input thereat; wherein
  the pressing input is indicative of a request to select said user-selected function of the recreational vehicle.

NEE16. The RVUI according to any one of the embodiments NEE10-NEE14, wherein
  the touchscreen of the RVUI is configured to display at least one input region; wherein
  the touchscreen of the RVUI is further configured to detect a momentary pressing at the at least one input region and responsive thereto to select said user-selected function of the recreational vehicle.

NEE17. The RVUI according to embodiment NEE16, wherein momentary pressing includes a tap or a short press of the at least one input region.

NEE18. A user interface panel comprising the RVUI according to any one of the embodiments NEE10-NEE17, wherein the user interface panel is attachable to a surface of the recreational vehicle.

NEE19. A recreational vehicle comprising the user interface panel according to embodiment NEE18.

NEE20. The recreational vehicle according to embodiment NEE19, wherein the recreational vehicle is a recreational vehicle selected from the group consisting of: a motorhome, a campervan, a caravan, a fifth-wheel trailer, a pop-up camper, a truck camper.

NEE21. Computer program, comprising instructions which, when executed on at least one processor, cause the at least one processor to carry out the method according to any one of the embodiments NEE1-NEE9.

NEE22. A carrier comprising the computer program of embodiment NEE20, wherein the carrier is one of an electronic signal, optical signal, radio signal or non-transitory computer readable storage medium.

NEE23. A method implemented in a Recreational Vessel User Interface (RVUI), for controlling at least one function of a recreational vessel, the method comprising:
displaying, at a touchscreen of the RVUI, a circular-shaped user input element; and
detecting, at the touchscreen of the RVUI, a user input comprising a movement along the displayed circular-shaped user input element, the movement being indicative of a request to control a user-selected function of the recreational vessel; and responsive to detecting said user input
initiating control of the user-selected function.

NEE24. The method according to embodiment NEE23, comprising:
transmitting a control signal representative of the user-selected function to a processor for control of the user-selected function.

NEE25. The method according to embodiment NEE24, wherein the control signal is transmitted to the processor wirelessly.

NEE26. The method according to any one of the embodiments NEE23-NEE25, comprising: animating, at the touchscreen of the RVUI, rotational movement of the user input along the displayed circular-shaped user input element in a manner that corresponds to the user movement.

NEE27. The method according to any one of the embodiments NEE23-NEE26, wherein the user-selected function includes any one or a combination of: a climate control function, a heater function, a ventilation function, a water heater function, a vessel battery function, a light control function, and a security alarm function.

NEE28. The method according to any one of the embodiments NEE23-NEE27, wherein the user-selected function is selected prior to the detecting of said user input.

NEE29. The method according to embodiment NEE28, comprising:
providing, at the RVUI, at least one input region configured to receive a pressing input, the at least one input region being physically depressible upon receiving the pressing input thereat; wherein
detecting a pressing input being indicative of a request to select said user-selected function of the recreational vessel.

NEE30. The method according to embodiment NEE28, comprising:
displaying, at the touchscreen of the RVUI, at least one input region; and
detecting a momentary pressing at the at least one input region and responsive thereto selecting said user-selected function of the recreational vessel.

NEE31. The method according to embodiment NEE29, wherein the momentary pressing includes a tap or a short press of the at least one input region.

NEE32. A Recreational Vessel User Interface (RVUI) for controlling at least one function of a recreational vessel, the RVUI comprising:
a touchscreen configured to display a circular-shaped user input element; wherein
the touchscreen is configured to detect a user input comprising a movement along the displayed circular-shaped user input element, the movement being indicative of a request to control a user-selected function of the recreational vessel; and wherein
the RVUI is further configured to initiate control of the user-selected function responsive to detecting said user input.

NEE33. The RVUI according to embodiment NEE32, wherein the RVUI is configured to transmit a control signal representative of the user-selected function to a processor for control of the user-selected function.

NEE34. The RVUI according to embodiment NEE33, wherein the RVUI is configured to transmit the control signal to the processor wirelessly.

NEE35. The RVUI according to any one of the embodiments NEE32-NEE34, wherein the touchscreen is configured to animate rotational movement of the user input along the displayed circular-shaped user input element in a manner that corresponds to the user movement.

NEE36. The RVUI according to any one of the embodiments NEE32-NEE35, wherein the user-selected function includes any one or a combination of: a climate control function, a heater function, a ventilation function, a water heater function, a vessel battery function, a light control function, and a security alarm function.

NEE37. The RVUI according to any one of the embodiments NEE32-NEE36, comprising:
at least one input region configured to receive a pressing input, the at least one input region being physically depressible upon receiving the pressing input thereat; wherein
the pressing input is indicative of a request to select said user-selected function of the recreational vessel.

NEE38. The RVUI according to any one of the embodiments NEE32-NEE37, wherein
the touchscreen of the RVUI is configured to display at least one input region; wherein
the touchscreen of the RVUI is further configured to detect a momentary pressing at the at least one input region and responsive thereto to select said user-selected function of the recreational vessel.

NEE39. The RVUI according to embodiment NEE38, wherein momentary pressing includes a tap or a short press of the at least one input region.

NEE40. A user interface panel comprising the RVUI according to any one of the embodiments NEE32-NEE39, wherein the user interface panel is attachable to a surface of the recreational vessel.

NEE41. A recreational vessel comprising the user interface panel according to embodiment NEE40.

NEE42. The recreational vessel according to embodiment NEE41, wherein the recreational vessel is a recreational vessel selected from the group consisting of: a sailing yacht, and a motor yacht.

NEE43. Computer program, comprising instructions which, when executed on at least one processor, cause the at least one processor to carry out the method according to any one of the embodiments NEE23-NEE30.

NEE44. A carrier comprising the computer program of embodiment NEE43, wherein the carrier is one of an electronic signal, optical signal, radio signal or non-transitory computer readable storage medium.

The invention claimed is:

1. A method implemented in a Recreational Vehicle User Interface, RVUI, of a RV monitoring and control system, which is operable to control at least one function of a recreational vehicle, the method comprising:
    displaying, at a touchscreen of the RVUI, a circular-shaped user input element; and
    detecting, at the touchscreen of the RVUI, a user input comprising a movement along the displayed circular-shaped user input element, the movement being indicative of a request to control a user-selected function of the recreational vehicle, wherein the user-selected function includes any one or a combination of: a climate control function, a heater function, a ventilation function, a water heater function, a vehicle battery function, a light control function, and a security alarm function; and
    responsive to detecting said user input, initiating control of the user-selected function via the control system to operably control the user-selected function,
    wherein the touchscreen is further configured to provide tactile feedback along the displayed circular-shaped user input element such that a user can sense the user's movement along the displayed circular-shaped user input element, the tactile feedback being implemented by a vibration-creating device configured to create vibrations in response to user input in the form of the movement along the displayed circular-shaped user input.

2. The method according to claim 1, comprising: transmitting a control signal representative of the user-selected function to a processor for control of the user-selected function.

3. The method according to claim 1, comprising: animating, at the touchscreen of the RVUI, rotational movement of the user input along the displayed circular-shaped user input element in a manner that corresponds to the user movement.

4. The method according to claim 1, wherein the user-selected function is selected prior to the detecting of said user input.

5. The method according to claim 4, comprising:
    providing, at the RVUI, at least one input region configured to receive a pressing input, the at least one input region being physically depressible upon receiving the pressing input thereat; wherein
    detecting a pressing input being indicative of a request to select said user-selected function of the recreational vehicle.

6. The method according to claim 4, comprising:
    displaying, at the touchscreen of the RVUI, at least one input region; and
    detecting a momentary pressing at the at least one input region and responsive thereto selecting said user-selected function of the recreational vehicle.

7. A Recreational Vehicle User Interface, RVIU, of a RV monitoring a control system, which is operable to control at least one function of a recreational vehicle, the RVUI comprising:
    a touchscreen configured to display a circular-shaped user input element; wherein
    the touchscreen is configured to detect a user input comprising a movement along the displayed circular-shaped user input element, the movement being indicative of a request to control a user-selected function of the recreational vehicle, wherein
    the user-selected function includes any one or a combination of: a climate control function, a heater function, a ventilation function, a water heater function, a vehicle battery function, a light control function, and a security alarm function; and wherein
    the RVUI is further configured to initiate control of the user-selected function responsive to detecting said user input via the control system to operably control the user-selected function,
    wherein the touchscreen is further configured to provide tactile feedback along the displayed circular-shaped user input element such that a user can sense the user's movement along the displayed circular-shaped user input element, the tactile feedback being implemented by a vibration-creating device configured to create vibrations in response to user input in the form of the movement along the displayed circular-shaped user input.

8. The RVUI according to claim 7, wherein the RVUI is configured to transmit a control signal representative of the user-selected function to a processor for control of the user-selected function.

9. The RVUI according to claim 7, wherein the touchscreen is configured to animate rotational movement of the user input along the displayed circular-shaped user input element in a manner that corresponds to the user movement.

10. The RVUI according to claim 7, comprising: at least one input region configured to receive a pressing input, the at least one input region being physically depressible upon receiving the pressing input thereat; wherein the pressing input is indicative of a request to select said user-selected function of the recreational vehicle.

11. The RVUI according to claim 7, wherein the touchscreen of the RVUI is configured to display at least one input region; wherein the touchscreen of the RVUI is further configured to detect a momentary pressing at the at least one input region and responsive thereto to select said user-selected function of the recreational vehicle.

12. A user interface panel comprising the RVUI according to claim 7, wherein the user interface panel is attachable to a surface of the recreational vehicle.

13. A recreational vehicle comprising the user interface panel according to claim 12.

* * * * *